United States Patent [19]
Sasaki

[11] Patent Number: 4,969,051
[45] Date of Patent: Nov. 6, 1990

[54] IMAGE PROCESSING APPARATUS
[75] Inventor: Tomio Sasaki, Tokyo, Japan
[73] Assignee: Ricoh Company, Ltd., Japan
[21] Appl. No.: 336,459
[22] Filed: Apr. 7, 1989
[30] Foreign Application Priority Data Apr. 14, 1988 [JP] Japan .................. 63-91945
Apr. 14, 1988 [JP] Japan .................. 63-91946
Apr. 14, 1988 [JP] Japan .................. 63-91947
Dec. 15, 1988 [JP] Japan .................. 63-317545

[51] Int. Cl.⁵ ..................... H04N 1/46; H04N 1/40
[52] U.S. Cl. ..................... 358/447; 358/452; 358/462; 358/464; 358/75
[58] Field of Search ............ 358/447, 448, 451, 452, 358/455, 461, 463, 464, 462, 75, 80

[56] References Cited
U.S. PATENT DOCUMENTS 4,686,580  8/1987  Kato et al. ................. 358/451
4,742,400  5/1988  Tsuji ......................... 358/458
4,827,433  5/1989  Kamen ....................... 355/55
4,841,337  6/1989  Hiratsuka et al. ......... 355/229

FOREIGN PATENT DOCUMENTS 0270090  6/1988  European Pat. Off. .
0027367  1/1989  Japan .
0126077  5/1989  Japan .

Primary Examiner—Edward L. Coles, Sr.
Assistant Examiner—Jerome Grant
Attorney, Agent, or Firm—Mason, Fenwick & Lawrence

[57] ABSTRACT

An image processing apparatus has a function of enlarging or reducing an image which is processed by a certain magnification. A modulation transfer function (MTF) correction circuit is provided in the image processing apparatus and the correction quantity or filter characteristic of this MTF correction circuit is automatically changed depending on a change in the magnification.

26 Claims, 22 Drawing Sheets

INPUT IMAGE DATA (100%)

| P11 | P12 | P13 | P14 | P15 | P16 |
|-----|-----|-----|-----|-----|-----|
| P21 | P22 | P23 | P24 | P25 | P26 |
| P31 | P32 | P33 | P34 | P35 | P36 |
| P41 | P42 | P43 | P44 | P45 | P46 |
| P51 | P52 | P53 | P54 | P55 | P56 |
| P61 | P62 | P63 | P64 | P65 | P66 |

FIG.4B

AFTER THIN-OUT (50%)

| P11 | P13 | P15 | P17 | P19 | P1B |
|-----|-----|-----|-----|-----|-----|
| P31 | P33 | P35 | P37 | P39 | P3B |
| P51 | P53 | P55 | P57 | P59 | P5B |
| P71 | P73 | P75 | P77 | P79 | P7B |
| P91 | P93 | P95 | P97 | P99 | P9B |
| PB1 | PB3 | PB5 | PB7 | PB9 | PBB |

FIG.4C

AFTER INTERPOLATION (200%)

| P11 | P11 | P12 | P12 | P13 | P13 |
|-----|-----|-----|-----|-----|-----|
| P11 | P11 | P12 | P12 | P13 | P13 |
| P21 | P21 | P22 | P22 | P23 | P23 |
| P21 | P21 | P22 | P22 | P23 | P23 |
| P31 | P31 | P32 | P32 | P33 | P33 |
| P31 | P31 | P32 | P32 | P33 | P33 |

FIG. 7

| P11 | P12 | P13 | P14 | P15 |
|---|---|---|---|---|
| P21 | P22 | P23 | P24 | P25 |
| P31 | P32 | P33 | P34 | P35 |
| P41 | P42 | P43 | P44 | P45 |
| P51 | P52 | P53 | P54 | P55 |

FIG. 10

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

FIG.9A

| 0 | 0 | 0 | 0 | 0 |
|---|---|---|---|---|
| 0 | 0 | $-\frac{1}{8}$ | 0 | 0 |
| 0 | $-\frac{1}{8}$ | $\frac{3}{2}$ | $-\frac{1}{8}$ | 0 |
| 0 | 0 | $-\frac{1}{8}$ | 0 | 0 |
| 0 | 0 | 0 | 0 | 0 |

FIG.9B

| 0 | 0 | 0 | 0 | 0 |
|---|---|---|---|---|
| 0 | 0 | $-\frac{1}{4}$ | 0 | 0 |
| 0 | $-\frac{1}{4}$ | 2 | $-\frac{1}{4}$ | 0 |
| 0 | 0 | $-\frac{1}{4}$ | 0 | 0 |
| 0 | 0 | 0 | 0 | 0 |

FIG.9C

| 0 | 0 | 0 | 0 | 0 |
|---|---|---|---|---|
| 0 | 0 | $-\frac{1}{2}$ | 0 | 0 |
| 0 | $-\frac{1}{4}$ | $\frac{5}{2}$ | $-\frac{1}{4}$ | 0 |
| 0 | 0 | $-\frac{1}{2}$ | 0 | 0 |
| 0 | 0 | 0 | 0 | 0 |

FIG.9D

| 0 | 0 | 0 | 0 | 0 |
|---|---|---|---|---|
| 0 | 0 | $-\frac{1}{2}$ | 0 | 0 |
| 0 | $-\frac{1}{2}$ | 3 | $-\frac{1}{2}$ | 0 |
| 0 | 0 | $-\frac{1}{2}$ | 0 | 0 |
| 0 | 0 | 0 | 0 | 0 |

FIG.9E

| 0 | 0 | 0 | 0 | 0 |
|---|---|---|---|---|
| 0 | 0 | $-\frac{3}{4}$ | 0 | 0 |
| 0 | $-\frac{3}{4}$ | 4 | $-\frac{3}{4}$ | 0 |
| 0 | 0 | $-\frac{3}{4}$ | 0 | 0 |
| 0 | 0 | 0 | 0 | 0 |

FIG. 9F

| 0 | 0 | $-\frac{1}{8}$ | 0 | 0 |
|---|---|---|---|---|
| 0 | 0 | 0 | 0 | 0 |
| $-\frac{1}{8}$ | 0 | $\frac{3}{2}$ | 0 | $-\frac{1}{8}$ |
| 0 | 0 | 0 | 0 | 0 |
| 0 | 0 | $-\frac{1}{8}$ | 0 | 0 |

FIG. 9G

| 0 | 0 | $-\frac{1}{4}$ | 0 | 0 |
|---|---|---|---|---|
| 0 | 0 | 0 | 0 | 0 |
| $-\frac{1}{4}$ | 0 | 2 | 0 | $-\frac{1}{4}$ |
| 0 | 0 | 0 | 0 | 0 |
| 0 | 0 | $-\frac{1}{4}$ | 0 | 0 |

FIG. 9H

| 0 | 0 | $-\frac{1}{2}$ | 0 | 0 |
|---|---|---|---|---|
| 0 | 0 | 0 | 0 | 0 |
| $-\frac{1}{4}$ | 0 | $\frac{5}{2}$ | 0 | $-\frac{1}{4}$ |
| 0 | 0 | 0 | 0 | 0 |
| 0 | 0 | $-\frac{1}{2}$ | 0 | 0 |

FIG. 9I

| 0 | 0 | $-\frac{1}{2}$ | 0 | 0 |
|---|---|---|---|---|
| 0 | 0 | 0 | 0 | 0 |
| $-\frac{1}{2}$ | 0 | 3 | 0 | $-\frac{1}{2}$ |
| 0 | 0 | 0 | 0 | 0 |
| 0 | 0 | $-\frac{1}{2}$ | 0 | 0 |

FIG. 9J

| 0 | 0 | $-\frac{3}{4}$ | 0 | 0 |
|---|---|---|---|---|
| 0 | 0 | 0 | 0 | 0 |
| $-\frac{3}{4}$ | 0 | 4 | 0 | $-\frac{3}{4}$ |
| 0 | 0 | 0 | 0 | 0 |
| 0 | 0 | $-\frac{3}{4}$ | 0 | 0 |

IMAGE PROCESSING APPARATUS

OF THE INVENTION

The present invention generally relates to image processing apparatuses, and more particularly to an image processing apparatus which subjects an image data of a document image to a processing including enlargement or reduction of the document image. Examples of the image processing apparatus are a digital copying machine, a facsimile machine, a filing apparatus, and a computer aided design (CAD) input apparatus.

Generally, when reading a document image, an image reading device such as a charge coupled device (CCD) image sensor reads the document image in minute regions (picture elements) through an optical system including lenses and the like, and converts the density read from each minute region into an electrical signal. The document image is scanned by relatively moving one of the document and the image reading device with respect to the other, and as a result, an image signal describing the entire document image is obtained. However, since the document image is read through the optical system, the quality including contrast and resolution of the image described by the image signal is deteriorated when compared to the quality of the original document image. This deterioration in the quality of the image is generally described by a modulation transfer function (MTF) value. In actual practice, the deterioration in the quality of the image is observed as a fading of the image, for example, and the deterioration in the quality of the image causes undesirable effects when making a character recognition and the like.

Accordingly, a so-called MTF correcting circuit is conventionally provided in this kind of an image reading device so as to compensate for the deterioration in the quality of the image and improve the resolution of the image. The MTF correcting circuit is a kind of a spatial filter which has a function of emphasizing high-frequency components so as to emphasize edges of the image or character. The filter characteristic of the MTF correcting circuit is fixed based on the MTF characteristic of the optical system employed by the image reading device.

On the other hand, in a digital copying machine, a facsimile machine, a filing apparatus and the like, there is often a demand to obtain an output image which is enlarged or reduced with respect to an input image (original document image). Hence, such apparatuses are provided with a function of varying the size of the output image with respect to the input image. But the following problems occur when this function is used.

Firstly, a portion of the input image drops out in the enlarged or reduced image when compared with a case where the input image is outputted in a full size (with a magnification of 100%), that is, the size of the output image is identical to that of the input image.

Secondly, a noise such as a dot which does not appear in the output image when the input image is outputted in the full size becomes conspicuous when the output image is obtained by enlarging or reducing the input image.

SUMMARY OF THE INVENTION

Accordingly, it is a general object of the present invention to provide a novel and useful image processing apparatus in which the problems described above are eliminated.

Another and more specific object of the present invention is to provide an image processing apparatus in which a filter characteristic of a modulation transfer function (MTF) correction circuit is automatically changed depending on a magnification of an output image with respect to an original image. When the original image is enlarged or reduced by a certain magnification, the spatial frequency changes in the output image. For example, when reading a document image which has a line chart with a density of 200 dots per inch (dpi), a period of the density change of white/black for a magnification of 50% is ½ that for a magnification of 100%. That is, the spatial frequency of the read image obtained with the magnification of 50% is two times that of the read image obtained with the magnification of 100%, and the read image is similar to that obtained in a case where a line chart with a density of 400 dpi is read. On the other hand, the period of the density change of white/black for a magnification of 200% is two times that for the magnification of 100%. That is, the spatial frequency of the read image obtained with the magnification of 200% is ½ that of the read image obtained with the magnification of 100%, and the read image is similar to that obtained in a case where a line chart with a density of 100 dpi is read. A modulation transfer function (MTF) correction is a process in which the image is emphasized depending on the spatial frequency, and for this reason, the result of the correction greatly changes when the spatial frequency of the information included in the image changes. In other words, when using an MTF correction circuit which is designed in conformance with the spatial frequency of the information included in the image which is read in full size, that is, the magnification of 100%, a deterioration in the read image increases when the image is reduced because the spatial frequency increases, and the MTF correction quantity is insufficient. On the other hand, the quality of the image deteriorates when the image is enlarged and the MTF correction quantity is excessively large. But according to the image processing apparatus of the present invention, it is possible always make an appropriate image correction since the filter characteristic of the MTF correction circuit is automatically changed depending on the magnification, and the MTF value of the image processing apparatus as a whole can be maintained constant. Accordingly, it is possible to prevent a dropout of an image portion and prevent generation of noise even when the image is enlarged or reduced.

Still another object of the present invention is to provide an image processing apparatus comprising image reading means for reading a density of an image of a document in a plurality of minute picture element regions and for outputting an analog image signal indicative of the read density, first magnification means for relatively moving one of the document and the image reading means with respect to the other so as to scan the document in a main scanning direction successively along a sub scanning direction with a scanning speed dependent on a designated magnification, thereby changing a magnification of the image in the sub scanning direction, converting means for converting the analog image signal outputted from the image reading means into a digital image signal, second magnification means for subjecting the output digital image signal of the converting means to a thin-out and/or an interpolation process, thereby changing the magnification of the image in the main scanning direction, and modulation transfer function correction means for correcting an image information of a portion of the picture element regions described by the digital image signal which is adjusted of the magnification thereof in the first and second magnification means, where the modulation transfer function correction means includes adjusting means for adjusting correction levels of the modulation transfer function correction means in the main and sub scanning directions depending on a change in the designated magnification. According to the image processing apparatus of the present invention, it is possible to positively prevent the quality of the image from becoming deteriorated even when the image is enlarged or reduced.

A further object of the present invention is to provide an image processing apparatus comprising image reading means for reading a density of an image of a document in a plurality of minute picture element regions and for outputting an analog image signal indicative of the read density, first magnification means for relatively moving one of the document and the image reading means with respect to the other so as to scan the document in a main scanning direction successively along a sub scanning direction with a scanning speed dependent on a designated magnification, thereby changing a magnification of the image in the sub scanning direction, converting means for converting the analog image signal outputted from the image reading means into a digital image signal, modulation transfer function correction means for correcting an image information of a portion of the picture element regions described by the output digital image signal of the converting means, and second magnification means for subjecting an output digital image signal of the modulation transfer function correction means to a thin-out and/or an interpolation process, thereby changing the magnification of the image in the main scanning direction, where the modulation transfer function correction means includes adjusting means for adjusting correction levels of the modulation transfer function correction means in the main and sub scanning directions depending on a change in the designated magnification.

Another object of the present invention is to provide an image processing apparatus comprising image reading means for reading a density of an image of a document in a plurality of minute picture element regions and for outputting an analog image signal indicative of the read density, first magnification means including an optical imaging means for imaging the image of the document on a reading surface of the image reading means for adjusting an imaging magnification of the optical imaging means in a main scanning direction depending on a designated magnification, second magnification means for relatively moving one of the document and the image reading means with respect to the other so as to scan the document in the main scanning direction successively along a sub scanning direction with a scanning speed dependent on a designated magnification, thereby changing a magnification of the image in the sub scanning direction, converting means for converting the analog image signal outputted from the image reading means into a digital image signal, and modulation transfer function correction means for correcting an image information of a portion of the picture element regions described by the digital image signal which is outputted from the converting means, the modulation transfer function correction means including adjusting means for adjusting correction levels of the modulation transfer function correction means in the main and sub scanning directions depending on a change in the designated magnification.

Still another object of the present invention is to provide an image processing apparatus comprising image reading means for reading a density of an image of a document in a plurality of minute picture element regions and for outputting an analog image signal indicative of the read density, scanning means for relatively moving one of the document and the image reading means with respect to the other so as to scan the document in a main scanning direction successively along a sub scanning direction, converting means for converting the analog image signal outputted from the image reading means into a digital image signal, magnification means for subjecting the output digital image signal of the converting means to a thin-out and/or an interpolation process with respect to the main and sub scanning directions depending on a designated magnification, thereby changing a magnification of the image in the main and sub scanning directions, and modulation transfer function correction means for correcting an image information of a portion of the picture element regions described by the digital image signal which is obtained from either one of the converting means and the magnification means, the modulation transfer function correction means including adjusting means for adjusting correction levels of the modulation transfer function correction means in the main and sub scanning directions depending on a change in the designated magnification.

Other objects and further features of the present invention will be apparent from the following detailed description when read in conjunction with the accompanying drawings.

BRIEF DESCRIPTION OF THE DRAWINGS

FIG. 1 is a front view generally showing an internal mechanism of an embodiment of an image processing apparatus according to the present invention;

FIGS. 4A through 4C are diagrams for explaining a change in an image data when the magnification is adjusted by thin-out and interpolation;

FIG. 7 shows a picture element region which is subject to a correction process in an MTF correction circuit of the image processing apparatus shown in FIG. 1;

FIGS. 9A through 9J and 10 are diagrams for explaining patterns of weighting coefficients assigned to each picture element position in the MTF correction circuit;

DETAILED DESCRIPTION

Figure 1:
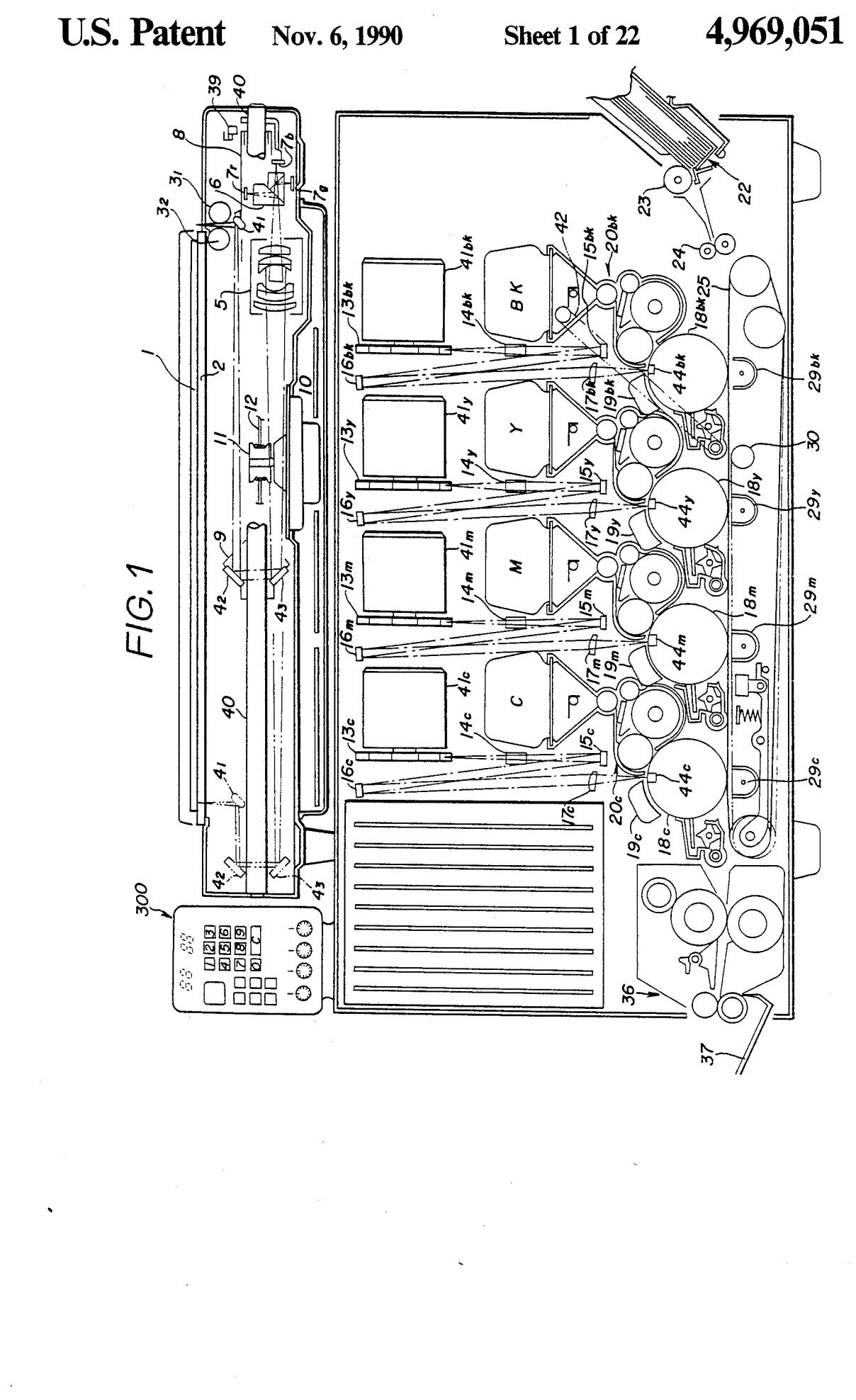
Figure 2:
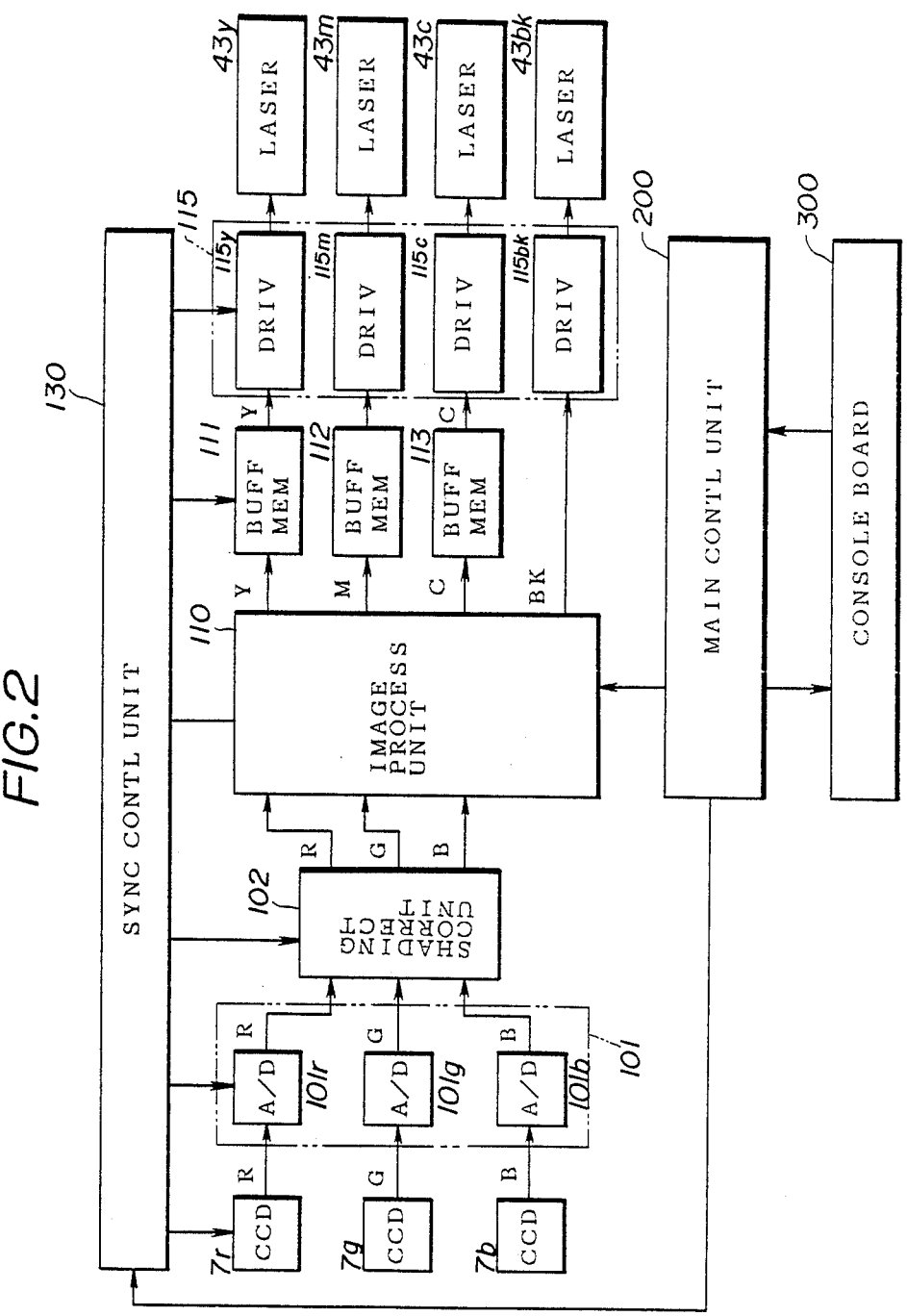
FIG. 2 is a system block diagram showing an embodiment of an image signal processing system of the image processing apparatus shown in FIG. 1.

FIG. 1 shows an internal mechanism of an embodiment of an image processing apparatus according to the present invention. In this embodiment, the image processing apparatus is a digital color copying machine. A document 1 is placed on a platen (contact glass) 2 and is illuminated by fluorescent lamps $3_1$ and $3_2$. A reflected light from the document 1 is reflected by movable first, second and third mirrors $4_1$, $4_2$ and $4_3$ and is directed towards a dichroic prism 6 via an imaging lens 5. The light is separated into read (R), green (G) and blue (B) lights having different wavelengths. The R, G and B lights respectively reach charge coupled devices (CCDs) 7r, 7g and 7b which are solid state image sensors.

The fluorescent lamps $3_1$ and $3_2$ and the first mirror $4_1$ are mounted on a first carriage 8, while the second and third mirrors $4_2$ and $4_3$ are mounted on a second carriage 9. By moving the second carriage 9 at ½ a moving speed of the first carriage 8, it is possible to maintain lengths of optical paths from the document 1 to the CCDs 7r, 7g and 7b constant. When reading the image of the document 1, the first and second carriages 8 and 9 are scanned from the right to left in FIG. 1. A carriage driving pulley 11 is fixed to a rotary shaft of a carriage driving motor 10, and the first carriage 9 is coupled to a carriage driving wire 12 which is wound on the carriage driving pulley 11. The wire 12 is wound on a pulley (not shown) which is provided on the second carriage 9. Hence, when the carriage driving motor 10 rotates in forward and reverse directions, the first and second carriages 8 and 9 move back and forth, that is, in a first direction for reading the document image and in a second direction for returning to a home position. The second carriage 9 moves at a speed which is ½ that of the first carriage 8.

The first carriage 8 in the home position is detected by a home position sensor 39 which is a reflection type photosensor. When the first carriage 8 moves to the right from the home position for the exposure and scanning, the first carriage 8 is no longer detected by the home position sensor 39 because it receives no light. But when the first carriage 8 returns to the home position, the home position sensor 39 receives a light and the first carriage 8 is stopped when the home position sensor 39 starts to receive the light.

FIG. 2 shows an embodiment of an image signal processing system of the image processing apparatus shown in FIG. 1. Output analog image signals of the CCDs 7r, 7g and 7b are supplied to corresponding analog-to-digital (A/D) converters 101r, 101g and 101b of an A/D converter part 101 and are converted into digital image signals. The digital signals are subjected to predetermined signal processings in a shading correction unit 102 and an image processing unit 110, and binary signals of black (BK), yellow (Y), magenta (M) and cyan (C) (recording color information) are outputted from the image processing unit 110. The binary signal of BK is supplied directly to a driver 115bk of a laser driver 115, while the binary signals of Y, M and C are supplied to corresponding drivers 115y, 115m and 115c of the laser driver 115 through respective buffer memories 111, 112 and 113. Output signals of the laser driver 115 are supplied to corresponding semiconductor lasers 43bk, 43y, 43m and 43c so as to modulate laser beams emitted therefrom by the recording color information.

A detailed description of the image signal processing system shown in FIG. 2 will be given later in the specification together with a description of a synchronization control unit 130, a main control unit 200 and a console board 300.

Returning now to the description of FIG. 1, the laser beams emitted from the semiconductor lasers 43bk, 43y, 43m and 43c are reflected by corresponding polygonal mirrors 13bk, 13y, 13m and 13c and directed towards corresponding fourth and fifth mirrors 15bk and 16bk, 15y and 16y, 15m and 16m and 15c and 16c through respective f0 lenses 14bk, 14y, 14m and 14c. The reflected lights from the fifth mirrors 16bk, 16y, 16m and 16c are imaged on corresponding photosensitive drums 18bk, 18y, 18m and 18c through respective cylindrical lenses 17bk, 17y, 17m and 17c which are provided for correcting errors caused by imperfect mirror surfaces of the polygonal mirrors 13bk, 13y, 13m and 13c.

The polygonal mirrors 13bk, 13y, 13m and 13c are fixed on corresponding rotary shafts of polygonal mirror driving motors 41bk, 41y, 41m and 41c. Each of the driving motors 41bk, 41y, 41m and 41c rotate at a constant speed so as to rotate the polygonal mirrors 13bk, 13y, 13m and 13c at a constant speed. When the polygonal mirrors 13bk, 13y, 13m and 13c rotate, the laser beams scan the corresponding photosensitive drums 18*bk*, 18*y*, 18*m* and 18*c* in a direction perpendicular to the rotating direction (clockwise) thereof, that is, along axes of the photosensitive drums 18*bk*, 18*y*, 18*m* and 18*c*.

A surface of each of the photosensitive drums 18*bk*, 18*y*, 18*m* and 18*c* is uniformly charged by a corresponding one of chargers 19*bk*, 19*y*, 19*m* and 19*c* which are coupled to a high negative voltage generator (not shown). When the laser beams modulated by the recording information scan the charged surface of the photosensitive drum, the charge on the surface of the photosensitive drum is grounded through a grounding structure and disappears due to the photoconductive phenomenon. The laser beam is turned OFF when scanning a surface portion corresponding to a portion of the document 1 having a high density and is turned ON when scanning a surface portion corresponding to a portion of the document 1 having a low density. As a result, a potential at the surface portion of each of the photosensitive drums 18*bk*, 18*y*, 18*m* and 18*c* corresponding to the portion of the document 1 having the high density becomes approximately $-800$ V while a potential at the surface portion of each of the photosensitive drums 18*bk*, 18*y*, 18*m* and 18*c* corresponding to the portion of the document 1 having the low density becomes approximately $-100$ V, and an electrostatic image is formed on the surface of each of the photosensitive drums 18*bk*, 18*y*, 18*m* and 18*c* depending on the density of the document 1.

The electrostatic images formed on the surfaces of the photosensitive drums 18*bk*, 18*y*, 18*m* and 18*c* are developed by respective developing units 20*bk*, 20*y*, 20*m* and 20*c*. Hence, a black toner image is formed on the surface of the photosensitive drum 18*bk*, a yellow toner image is formed on the surface of the photosensitive drum 18*y*, a magenta toner image is formed on the surface of the photosensitive drum 18*m* and a cyan toner image is formed on the surface of the photosensitive drum 18*c*. The toners within each of the developing units 20*bk*, 20*y*, 20*m* and 20*c* are positively charged, while the developing units 20*bk*, 20*y*, 20*m* and 20*c* are biased to approximately $-200$ V by a developing bias generator (not shown). For this reason, the toners adhere on those surface portions of the photosensitive drums 18*bk*, 18*y*, 18*m* and 18*c* having a potential higher than the developing bias voltage so as to form the respective toner images of the document 1.

On the other hand, a recording sheet 267 accommodated within a cassette 22 is supplied by an operation of supply rollers 23. The recording sheet 267 is supplied to a transfer belt 25 with a predetermined timing controlled by resist rollers 24. The recording sheet 267 transported on the transfer belt 25 successively passes lower portions of the photosensitive drums 18*bk*, 18*y*, 18*m* and 18*c*, and the black, yellow, magenta and cyan toner images are successively transferred onto the recording sheet 267 by the operation of chargers 29*bk*, 29*y*, 29*m* and 29*c*. The overlapping toner images on the recording sheet 267 are fixed by a thermal fixing unit 36 and the recording sheet 267 is ejected onto a tray 37.

The digital copying machine shown in FIG. 1 has a function of adjusting a magnification of the image which is printed with respect to the size of the original image of the document 1. In other words, the lengths of the printed image along the main and sub scanning directions can be changed from those of the original image so that a ratio of the sizes of the printed image and the original image is not 1:1.

Figure 3B:
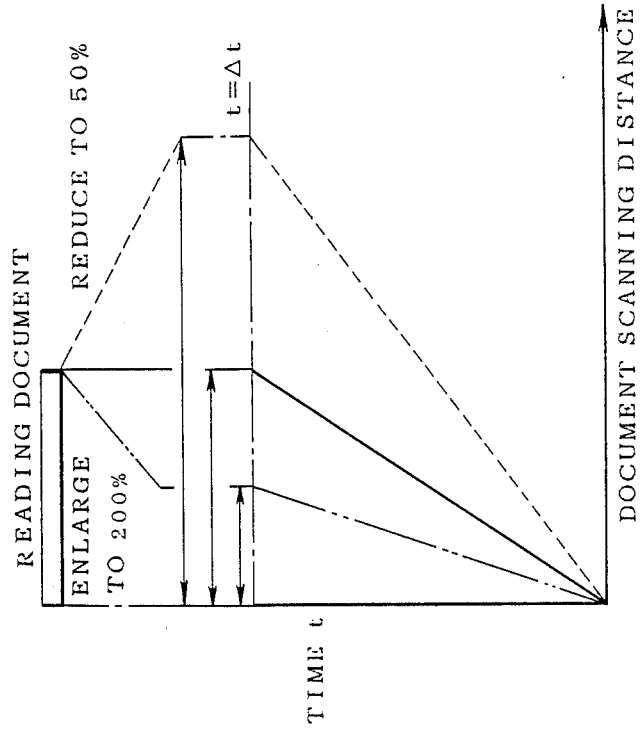
FIGS. 3A and 3B are diagrams for explaining a change in an optical path caused by a change in a magnification.
Figure 3A:
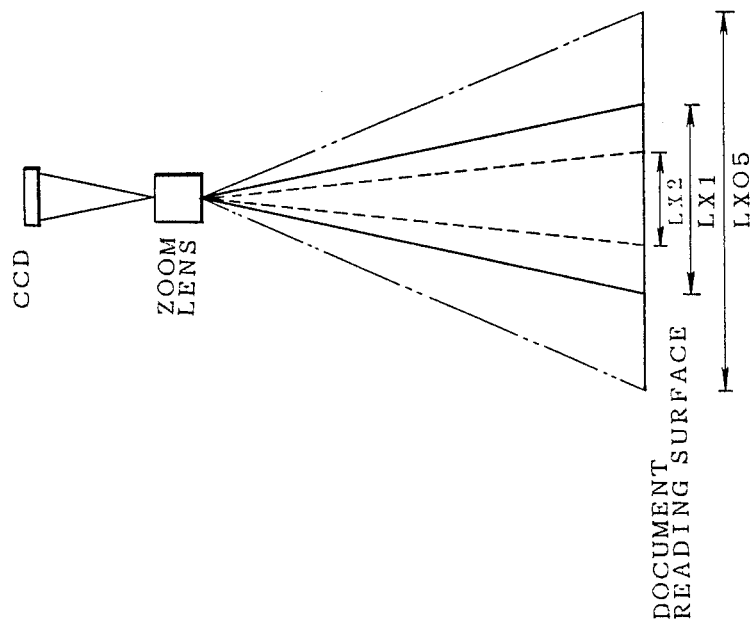

Next, a description will be given of the adjustment of the magnification. The imaging lens 5 is a zoom lens and is capable of adjusting the magnification. As shown in FIG. 3A, an imaging takes place so that an image in a region LX1 along a main scanning direction of a document reading surface corresponds to an entire length of a reading surface of a CCD (full width along the main scanning direction) when a magnification of a zoom lens is set to a reference magnification of 100%. When the magnification of the zoom lens is set to 50%, the image is reduced and the imaging takes place so that an image in a region LX05 on the document reading surface and amounting to two times the region LX1 corresponds to the entire length of the reading surface of the CCD. In addition, when the magnification of the zoom lens is set to 200%, an imaging takes place so that an image in a region LX2 on the document reading surface and amounting to ½ the region LX1 corresponds to the entire length of the reading surface of the CCD.

Accordingly, it is possible to adjust the magnification along the main scanning direction of the printed image with respect to the original image by adjusting the magnification of the zoom lens.

The magnification along the sub scanning direction of the printed image with respect to the original image can be adjusted by adjusting the rotational speed of the carriage driving motor 10. In other words, since the scanning position on the document image imaged on the CCD changes as shown in FIG. 3B depending on the scanning speeds of the first and second carriages 8 and 9 which move in the first direction when reading the document image, the size of the read image is reduced to 50% with respect to the original image when the scanning speeds are set to two times corresponding reference scanning speeds which are used when the magnification is set to 100%, while the size of the read image is enlarged to 200% with respect to the original image when the scanning speeds are set to ½ the corresponding reference scanning speeds.

In addition, this embodiment enables adjustment of the magnification by a digital signal processing after the reading of the document image.

FIGS. 4A, 4B and 4C respectively show an input image data with a magnification of 100%, a reduced image data with a magnification of 50% and an enlarged image data with a magnification of 200%. When obtaining the reduced image data with a magnification of 50%, every other picture element data P12, P14, P16, . . . along the main scanning direction of the input image are thinned out (deleted) and every other line data P2*n*, P4*n*, P6*n*, . . . where n=1, 2, 3, . . . are thinned out. Hence, the size of the image after the thin-out is reduced to ½ (50%) compared to that of the input image. On the other hand, when obtaining the enlarged image data with a magnification of 200%, a picture element data identical to that of an immediately preceding picture element is interpolated between data of every two successive picture elements along the main scanning direction of the input image and a line data identical to that of an immediately preceding line is interpolated between data of every two successive lines along the sub scanning direction of the input image. Thus, the size of the image after the interpolation is enlarged to two times (200%) compared to that of the input image.

Next, a description will be given of an operation of the image signal processing system of the image processing apparatus shown in FIG. 1, by referring to FIG. 2. In FIG. 2, analog image signals outputted from the CCDs 7r, 7g and 7b are converted into three multi-level digital image signals respectively indicating density levels of red (R), blue (B) and green (B) by the A/D converter part 101. The digital image signals from the A/D converter part 101 are supplied to the shading correction unit 102 wherein the gradation levels are corrected, and output signals of the shading correction unit 102 are supplied to the image processing unit 110. The image processing unit 110 outputs image signals of yellow (Y), magenta (M) and cyan (C) for recording.

Figure 5:
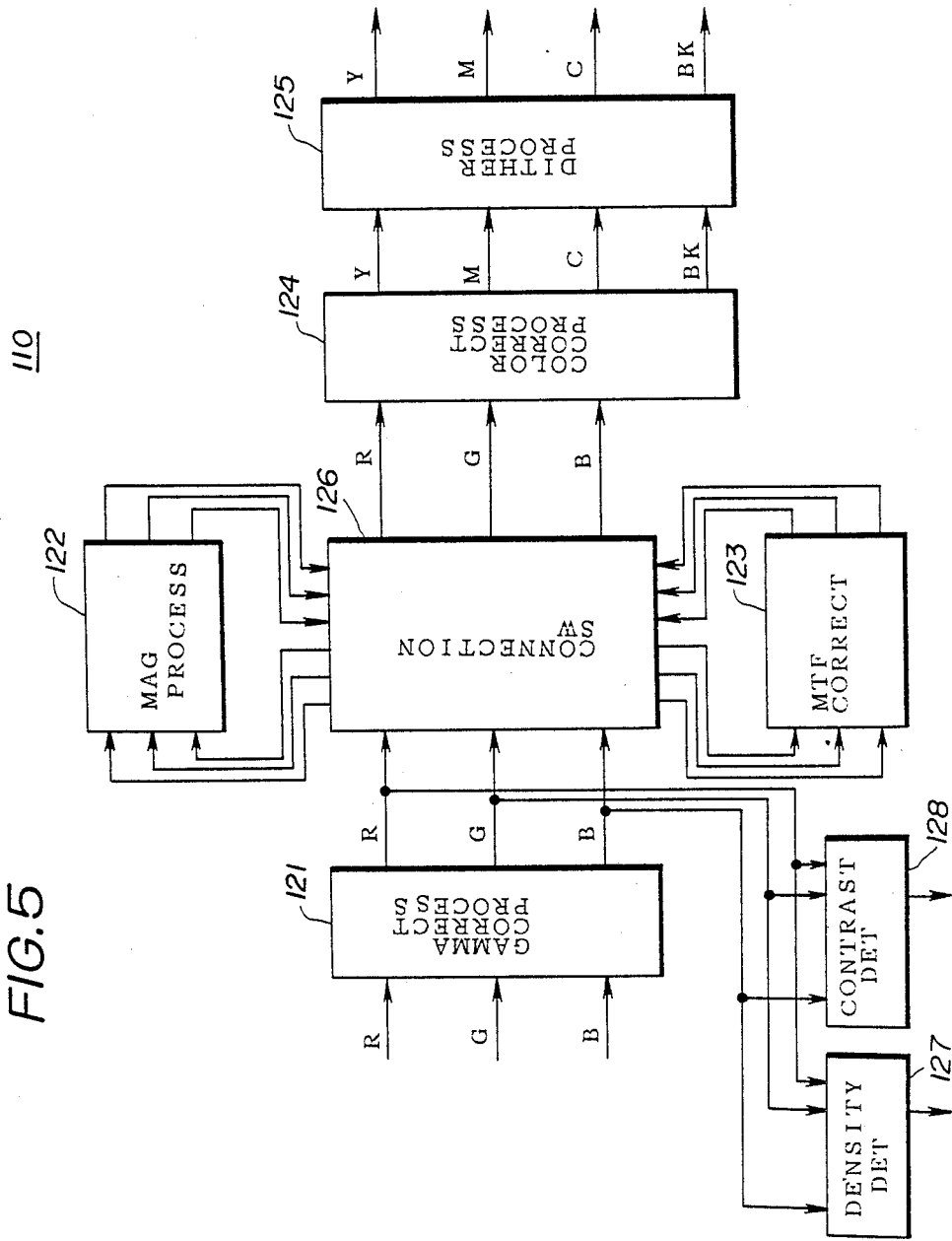
FIG. 5 is a system block diagram showing an embodiment of an image processing unit shown in FIG. 2.

FIG. 5 shows an embodiment of the image processing unit 110. The image processing unit 110 includes a gamma correction processing circuit 121, a magnification processing circuit 122, an MTF correction circuit 123, a color correction processing circuit 124, a dither processing circuit 125, a connection switching circuit 126, a density detection circuit 127, and a contrast detection circuit 128.

The magnification processing circuit 122 has a function of changing the magnification by carrying out the thin-out and interpolation shown in FIGS. 4B and 4C, for example, in response to an instruction from the main control unit 200. The MTF correction circuit 123 compensates for a deterioration in the picture quality which occurs when reading the image, and in this embodiment, the correction characteristic is adjusted depending on the various conditions at the time of reading the image.

The connection switching circuit 126 switches the connection of the magnification processing circuit 122 and the MTF correction circuit 123. In other words, in a first connection state, the connection switching circuit 126 switches the connection so that the output signal of the gamma correction circuit 121 is supplied to the magnification processing circuit 122, the output signal of the magnification processing circuit 122 is supplied to the MTF correction circuit 123, and the output signal of the MTF correction circuit 123 is supplied to the color correction processing circuit 124. On the other hand, in a second connection state, the connection switching circuit 126 switches the connection so that the output signal of the gamma correction circuit 121 is supplied to the MTF correction circuit 123, the output signal of the MTF correction circuit 123 is supplied to the magnification processing circuit 122, and the output signal of the magnification processing circuit 122 is supplied to the color correction processing circuit 124. The first and second connection states are determined responsive to the instruction from the main control unit 200.

The density detection circuit 127 detects the gradation of each of the picture elements within a predetermined image region which is made up of a plurality of picture elements including an object picture element and discriminates whether or not an average gradation level is greater than a predetermined threshold value. The contrast detection circuit 128 detects the contrast of the predetermined image region, that is, a difference having gradation levels which are greater than or equal to a certain threshold value and an average gradation of picture elements having gradation levels which are less than the certain threshold value. In addition, the contrast detection circuit 128 discriminates whether or not the detected contrast is greater than a predetermined threshold value.

Figure 6:
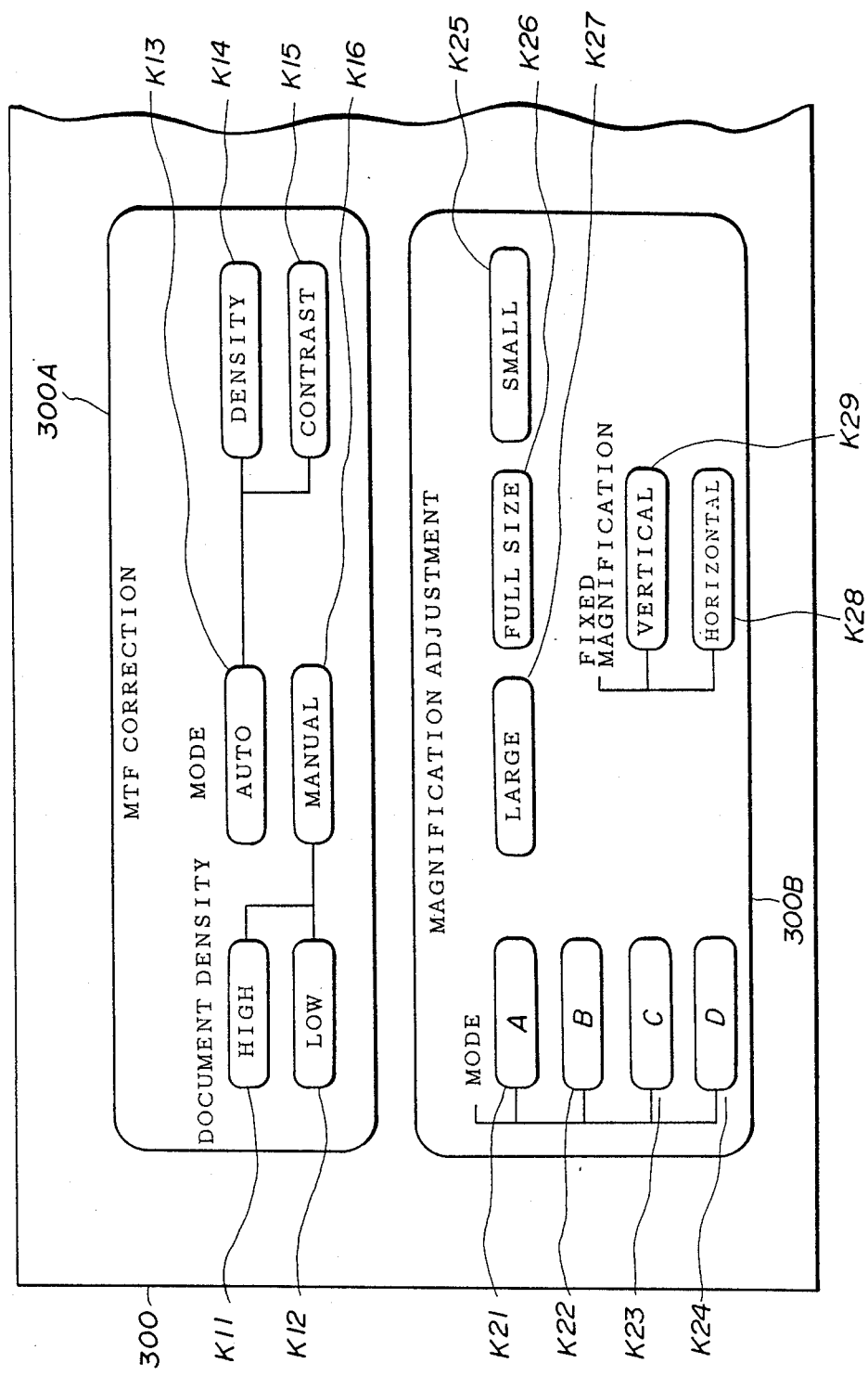
FIG. 6 is a plan view showing a part of a console board of the image processing apparatus shown in FIG. 1.

FIG. 6 shows a part of the console board 300 of the digital color copying machine shown in FIG. 1. The console board 300 has an MTF correction part 300A having keys K11 through K16 and a magnification adjusting part 300B having keys K21 through K29. The key K13 is used for instructing an automatic mode and the key K16 is used for instructing a manual mode. In the manual mode, a condition dependent on the density of the document 1 can be selected by manipulating the keys K11 and K12. In other words, when the operator pushes the key K11, it is assumed that the density of the document 1 is relatively high and the input image is clear, but it is assumed that the density of the document 1 is relatively low and the input image is light when the operator pushes the key K12. The correction quantity of the MTF correction circuit 123 shown in FIG. 5 changes depending on the selection of this condition.

When the automatic mode is instructed, it is possible to select one of a density mode and a contrast mode. The density mode is selected when the key K14 is pushed, and the correction quantity of the MTF correction circuit 123 is automatically changed in response to the output signal of the density detection circuit 127. On the other hand, the contrast mode is selected when the key K15 is pushed, and the correction quantity of the MTF correction circuit 123 is automatically changed in response to the output signal of the contrast detection circuit 128.

The keys K21, K22, K23 and K24 respectively instruct a magnification mode to a first mode, a second mode, a third mode and a fourth mode. The operations in each of the first through fourth modes are as follows.

In the first mode, the magnification in the main scanning direction is adjusted by the thin-out and interpolation of the picture element data, and the magnification in the sub scanning direction is adjusted by the adjustment of the image scanning (reading) speed. In addition, the magnification process in the main scanning direction is carried out after the MTF correction.

In the second mode, the magnification in the main scanning direction is adjusted by the thin-out and interpolation of the picture element data, and the magnification in the sub scanning direction is adjusted by the adjustment of the image scanning speed. In addition, the MTF correction is carried out after the magnification process in the main scanning direction.

In the third mode, the size of the reading image in the main scanning direction is adjusted by adjusting the magnification of the imaging lens 5, and the magnification in the sub scanning direction is adjusted by adjusting the image scanning speed. Further, the MTF correction is carried out after the adjustment of the magnification.

In the fourth mode, the magnification in both the main and sub scanning directions is adjusted by the thin-out and interpolation of the picture element data. The magnification process is carried out after the MTF correction.

The keys K25, K26 and K27 respectively instruct reduction of the image, returning to the standard magnification of 100% (full size) and the enlargement of the image. The keys K28 and K29 are respectively used to fix the magnification in the vertical direction (sub scanning direction) and the horizontal direction (main scanning direction). In other words, the keys K28 and K29 may be pushed to further adjust the magnification so as to set the magnification in the main scanning direction and the magnification in the sub scanning direction to mutually different values.

Next, a description will be given of the MTF correction circuit 123 shown in FIG. 5. In this embodiment, the MTF correction circuit 123 is designed to process a 5×5 two-dimensional picture element region. In other words, a center picture element P33 in FIG. 7 is an object picture element, and the MTF correction circuit 123 outputs a corrected data by using the data of the twenty-five picture elements in a range of picture elements P11 through P55. The picture element region which is the subject of the correction process moves in the main and sub scanning direction depending on the image scanning.

Figure 8A:
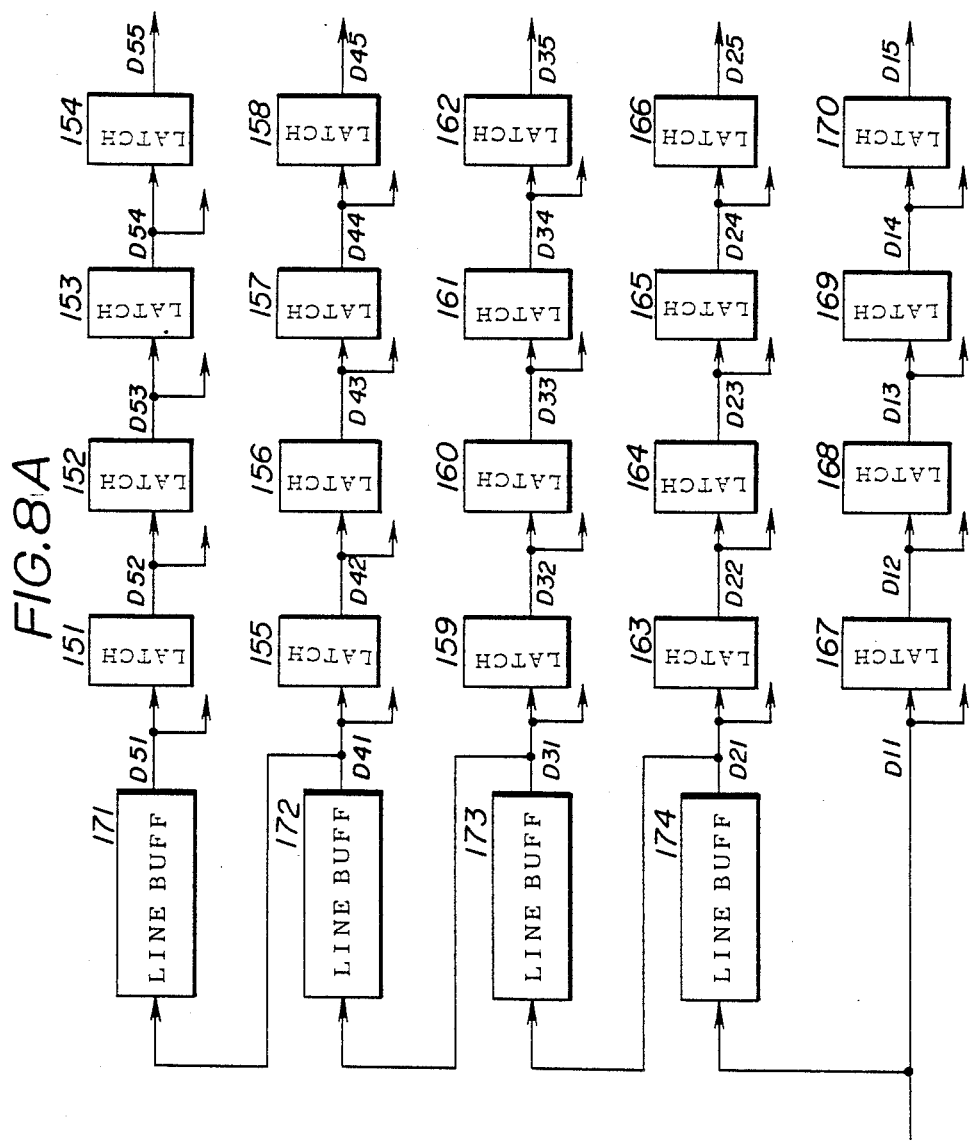
FIGS. 8A through 8C are system block diagrams showing essential parts of an embodiment of the MTF correction circuit.
Figure 8B:
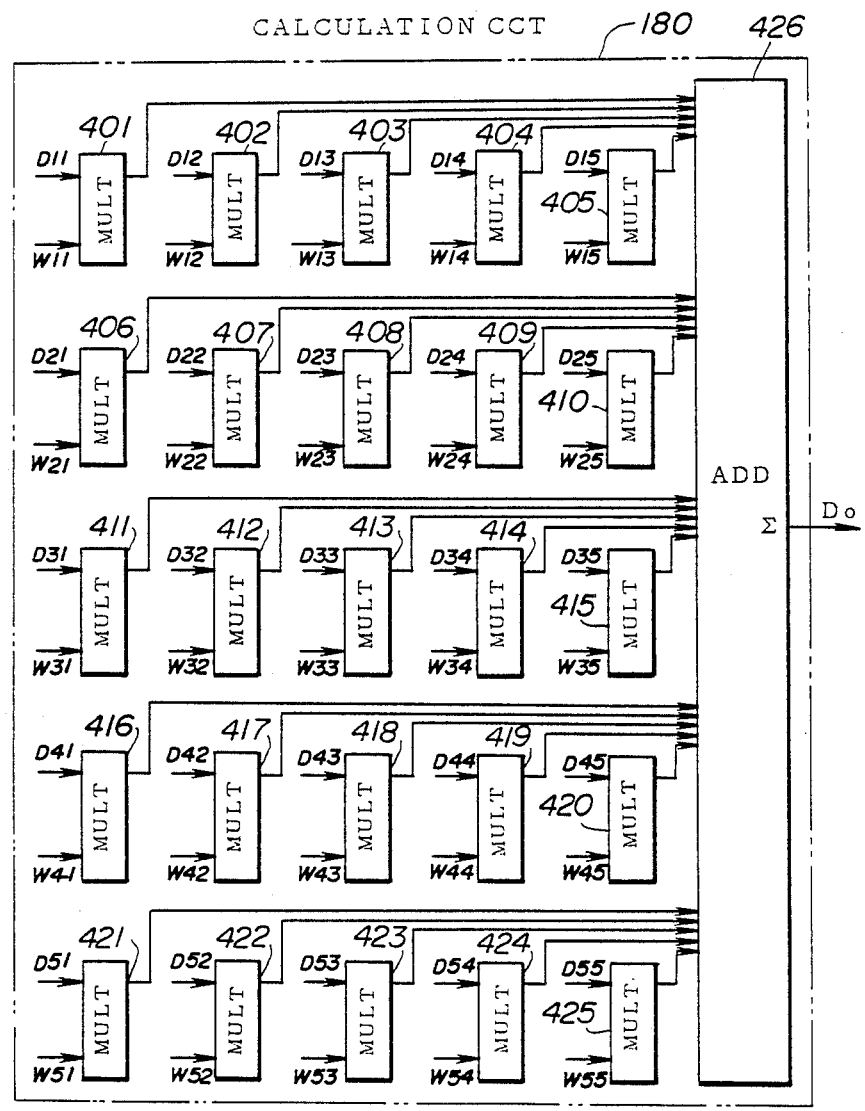
Figure 8C:
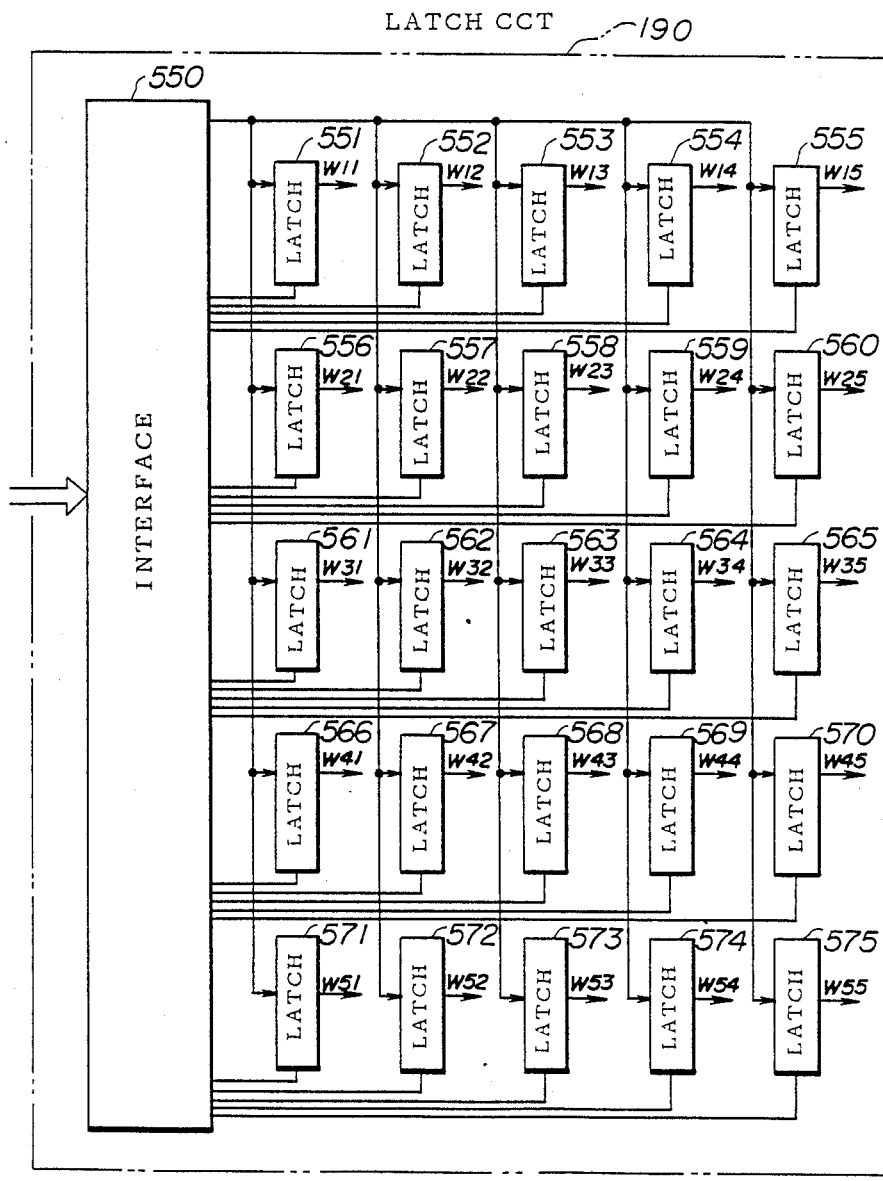

Essential parts of the MTF correction circuit 123 are shown in FIGS. 8A, 8B and 8C. A circuit part shown in FIG. 8A is provided to output gradation data of the twenty-five picture elements which are subject to the correction process with identical timings. That is, a digital gradation data supplied to the MTF correction circuit 123 as the image information is a serial data which indicates the position on the image in terms of the scanning time, and for this reason, a special circuit is needed to output the data of the plurality of picture elements located at mutually different positions with identical timings.

In FIG. 8A, twenty latch circuits 151 through 170 are respectively provided to obtain a delay time amounting to a scanning time of one picture element in the main scanning direction, and four line buffers 171 through 174 are respectively provided to obtain a delay time amounting to a scanning time of one line in the sub scanning direction. For example, data $D_{52}$, $D_{53}$, $D_{54}$ and $D_{55}$ outputted from the respective latch circuits 151, 152, 153 and 154 are data respectively obtained at times which are one picture element, two picture elements, three picture elements and four picture elements before a data $D_{51}$ supplied to the latch circuit 151. In addition, data $D_{21}$, $D_{31}$, $D_{41}$ and $D_{51}$ outputted from the respective line buffers 174, 173, 172 and 171 are data respectively obtained at times which are one line, two lines, three lines and four lines before a data $D_{11}$ supplied to the line buffer 174.

Accordingly, assuming that the main scan is made from right to left in the horizontal direction in FIG. 7 and the sub scan is made from top to bottom in the vertical direction in FIG. 7, the picture elements P11 through P55 shown in FIG. 7 respectively correspond to the data $D_{11}$ through $D_{55}$ shown in FIG. 8A. In other words, when the scanning position along the main scanning direction is denoted by x and the scanning position along the sub scanning direction is denoted by y, each picture element P(x, y) corresponds to the data D(x, y). Hence, the data of the 5×5 picture element region shown in FIG. 7 are obtained with identical timings.

A calculation circuit 180 shown in FIG. 8B carries out the actual calculation process of the MTF correction. In the MTF correction of this embodiment, a predetermined weighting coefficient is assigned to each of the twenty-five picture elements shown in FIG. 7, and a total sum of the products obtained by multiplying the weighting coefficients to the data at each of the picture element positions becomes an output data Do of the MTF correction circuit 123.

Twenty-five multipliers 401 through 425 respectively carry out multiplication of the input picture element data $D_{11}$ through $D_{55}$ (that is, the data D(x, y)) and weighting coefficients $W_{11}$ through $W_{55}$ (that is, weighting coefficients W(x, y)). An adder 426 outputs a total sum of the calculation results outputted from the multipliers 401 through 425. In this embodiment, the output data Do is treated as a 6-bit data indicating gradation levels of "0" to "63", and thus, the result of the calculation is limited to "0" when the result is a negative value and to "63" when the result is "64" or over.

The twenty-five weighting coefficients W(x, y) supplied to the calculation circuit 180 shown in FIG. 8B is outputted from a latch circuit 190 shown in FIG. 8C. The latch circuit 190 has an input/output interface 550 and twenty-five latch circuits 551 through 575, and the weighting coefficients W(x, y) held in each of the latch circuits 551 through 575 are successively renewed by the main control unit 200 through the interface 550.

The content of the corrected data outputted from the MTF correction circuit 123 changes when the weighting coefficients of the picture elements are changed. In other words, the correction quantity of the MTF correction circuit 123 can be changed by the main control unit 200 if necessary. The weighting coefficients having the patterns shown in FIGS. 9A through 9J are used in this embodiment. In each of the patterns, the weighting coefficient of the object picture element is set to a positive value and the weighting coefficients of the surrounding picture elements are set to negative values or "0" so that a total sum of the weighting coefficients becomes equal to "1". The MTF correction circuits having the weighting coefficients with the patterns shown in FIGS. 9A through 9J have mutually different correction characteristics. The MTF correction circuits having such weighting coefficients have a function of emphasizing two-dimensional edges. On the other hand, when the weighting coefficient of the object picture element is set to "1" and the weighting coefficients of the other picture elements are set to "0" as shown in FIG. 10, the correction quantity becomes equal to "0" and the input data and the output data of the MTF correction circuit become the same.

Figure 11:
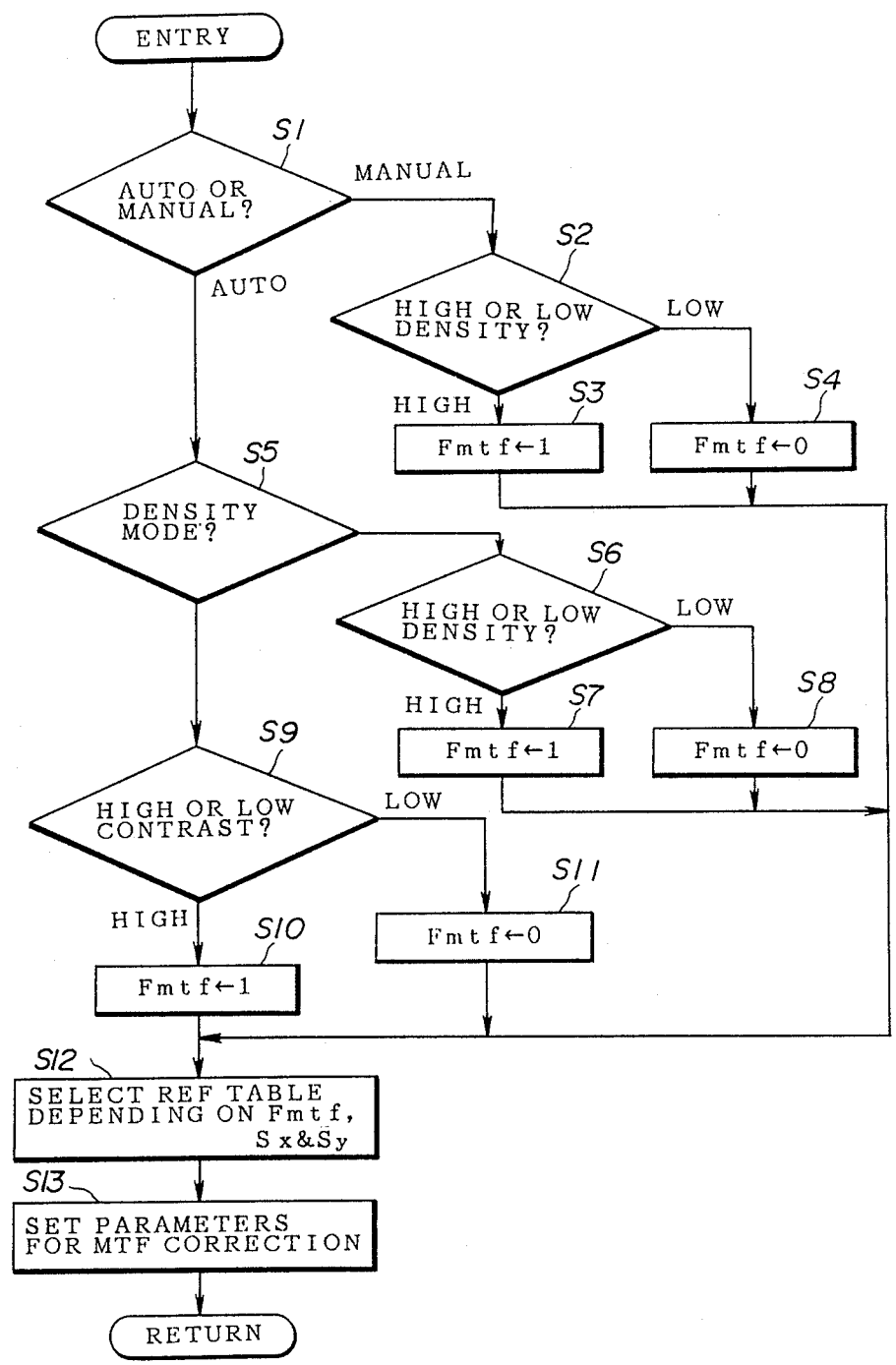
FIG. 11 is a flow chart for explaining a part of an operation of a main control unit of the image processing apparatus shown in FIG. 1.

FIG. 11 shows a flow chart of a part of an operation of the main control unit 200 related to the MTF correction. In FIG. 11, a step S1 discriminates whether the MTF mode is set to the automatic mode or the manual mode depending on the instructions from the keys K13 and K16 of the console board 300. When the manual mode is selected, a step S2 discriminates whether the document density is set to a high density or a low density. The high density is selected when the key K11 is pushed and the low density is selected when the key K12 is pushed, but the document density is initially set to the high density. A step S3 sets a flag Fmtf to "1" when the high density is selected, and a step S4 clears the flag Fmtf to "0" when the low density is selected.

On the other hand, when the automatic mode is selected, a step S5 discriminates whether or not the density mode is selected. Since the density mode is selected when the key k14 of the console board 300 is pushed and the contrast mode is selected when the key k15 is pushed, it is discriminated that the contrast mode is selected when the discrimination result in the step S5 is NO.

When the discrimination result in the step S5 is YES, a step S6 discriminates the state of the binary signal which is outputted from the density detection circuit 127 shown in FIG. 5 and is indicative of the density of the document 1. A step S7 sets the flag Fmtf to "1" when the density is high, and a step S8 clears the flag Fmtf to "0" when the density is low. On the other hand, when the discrimination result in the step S5 is NO, a step S9 discriminates the state of the binary signal which is outputted from the contrast detection circuit 128 shown in FIG. 5 and is indicative of the contrast of the document 1. A step S10 sets the flag Fmtf to "1"

when the contrast is high, and a step S11 clears the flag Fmtf to "0" when the contrast is low.

For example, data on the weighting coefficients having the various patterns shown in FIGS. 9A through 9J which are to be set in the MTF correction circuit 123 are prestored in an internal memory (for example, a ROM which is not shown) of the main control unit 200 in a form of reference tables for each of the patterns. A step S12 shown in FIG. 11 selects a reference table of a specific one of the plurality of patterns based on the flag Fmtf, a magnification Sx in the x direction and a magnification Sy in the y direction. Then, a step S13 sets data (parameters) in the twenty-five latch circuits 551 through 575 shown in FIG. 8C based on the contents of the reference table selected in the step S12 so as to obtain the weighting coefficients $W_{11}$ through $W_{55}$.

Hence, in this embodiment, the correction quantity, that is, the filter characteristic, of the MTF correction circuit 123 is automatically adjusted depending on the magnifications Sx and Sy along the main and sub scanning directions and the flag Fmtf which indicates the kind of the image which is processed. When the manual mode is selected as the MTF mode, the filter characteristic can be changed depending on the kind of the document image (density and contrast) according to the operator's judgment. In addition, when the automatic mode is selected as the MTF mode, the filter characteristic is automatically adjusted depending on either one of the density and contrast of the actual document image.

The reasons for changing the characteristic of the MTF correction circuit 123 depending on the kind of document image and the change in the magnification are as follows. That is, the MTF of the optical system provided in the image processing apparatus such as the digital color copying machine changes depending on the spatial frequency, and the MTF generally becomes small especially in the high-frequency region when no MTF correction is made. In other words, each small image portion included in the document image may be a collection of small images such as characters and lines or an edge portion of the document image, and in such cases, the contrast of the read image becomes poor and faded, making it difficult to carry out a character recognition, for example.

Figure 12A:
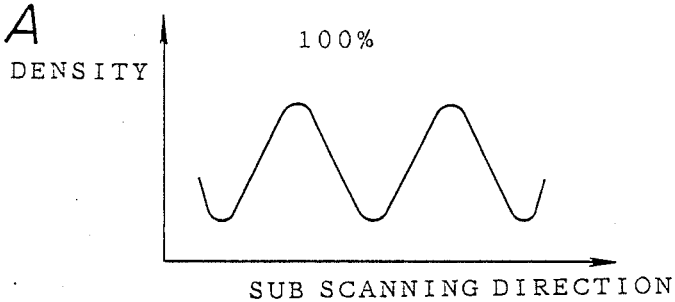
FIGS. 12A, 12B and 12C respectively show changes in density in a sub scanning direction of a read image when a document image has a density which changes repetitively in a form of a sinusoidal wave and the document is read with magnifications of 100%, 50% and 200%.
Figure 12B:
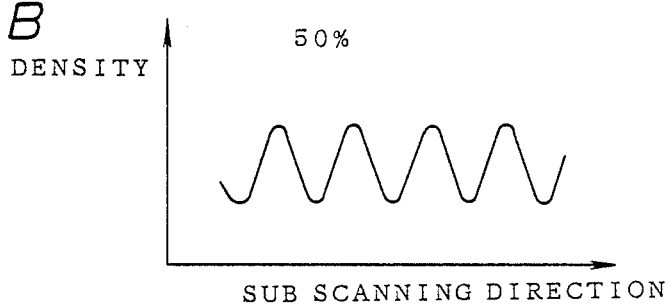
Figure 12C:
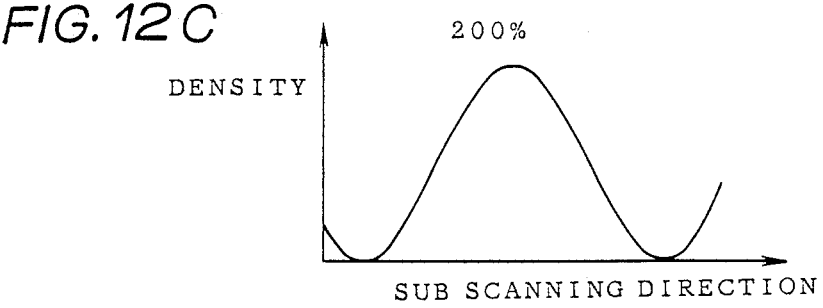

FIGS. 12A, 12B and 12C respectively show the changes in the density in the sub scanning direction of the read image when the document image has a density which changes repetitively in the form of a sinusoidal wave and the document 1 is read with magnifications of 100%, 50% and 200%. As may be seen from FIGS. 12A through 12C, the frequencies of the changes in the densities when the magnifications are changed to 50% and 200% respectively become two times and ½ the frequency of the change in the density when the magnification is set to 100%, and the amplitude of the change in the density (contrast), that is, the MTF, accordingly changes. This means that the characteristic (MTF) of the optical system changes depending on the spatial frequency.

As described before, the MTF correction circuit 123 which is provided for the purpose of compensating for the deterioration in the picture quality caused by the optical system generally carries out an emphasis with respect to the high-frequency component, and the frequencies which are emphasized are determined by the construction of the MTF correction circuit 123. But when the magnification is changed as shown in FIGS. 12A through 12C, the spatial frequency included in the document image changes therewith. For this reason, when the characteristic of the MTF correction circuit 123 is fixed, the MTF correction quantity may become insufficient or excessively large when the magnification is changed. When the MTF correction quantity is insufficient, the resolution is deteriorated. On the other hand, the noise in the background of the image is emphasized when the MTF correction quantity is excessively large.

The results similar to those of FIGS. 12A through 12C are obtained when the magnification of the read image is changed by adjusting the magnification of the imaging lens 5 in the main scanning direction of the image.

Figure 13A:
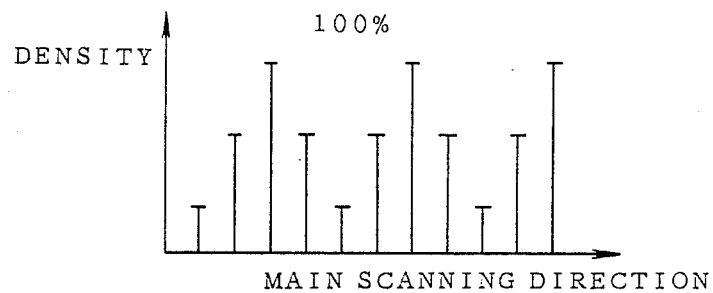
FIGS. 13A, 13B.and 13C respectively show changes in density in a main scanning direction of a read image when a document image has a density which changes repetitively in a form of a sinusoidal wave and the document is read with magnifications of 100%, 50% and 200%.
Figure 13B:
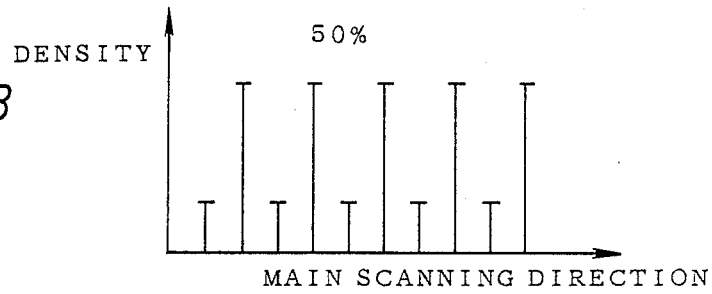
Figure 13C:
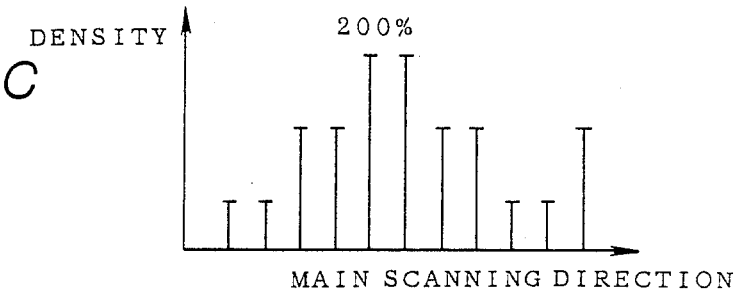

FIGS. 13A, 13B and 13C respectively show the changes in the density in the main scanning direction of the read image when the document image has a density which changes repetitively in the form of a sinusoidal wave and the document 1 is read with magnifications of 100%, 50% and 200% by adjusting the magnification by the thin-out and interpolation of the digital image signal. As may be seen from FIGS. 13A through 13C, the frequencies of the changes in the densities change similarly to the case where the magnification is adjusted by the optical system. For this reason, when the characteristic of the MTF correction circuit 123 is fixed, the MTF correction quantity may become insufficient or excessively large when the magnification is changed.

Figure 14A:
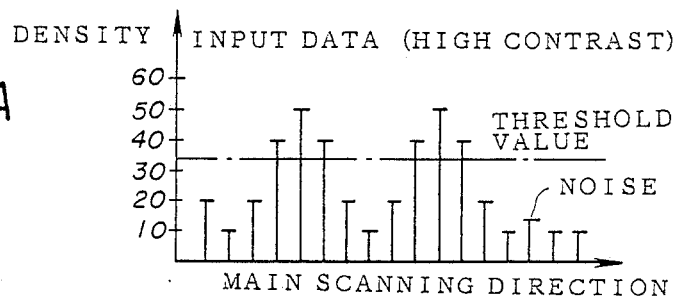
FIG. 14A shows an input image data to the MTF correction circuit when the document image is a clear printed matter having a relatively high contrast.
Figure 14B:
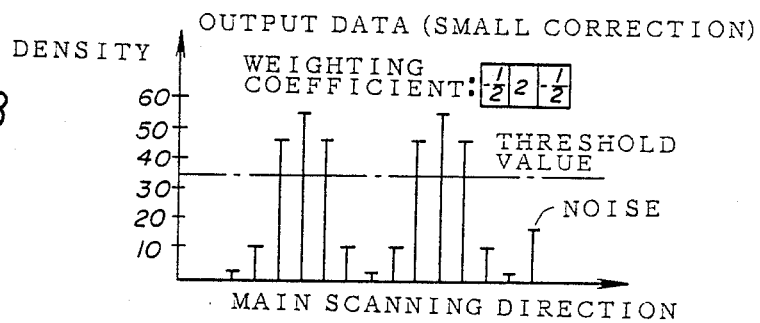
FIGS. 14B and 14C respectively show corrected image data outputted in response to the input image data shown in FIG. 14A from the MTF correction circuit for different characteristics wherein weighting coefficients are mutually different.
Figure 14C:
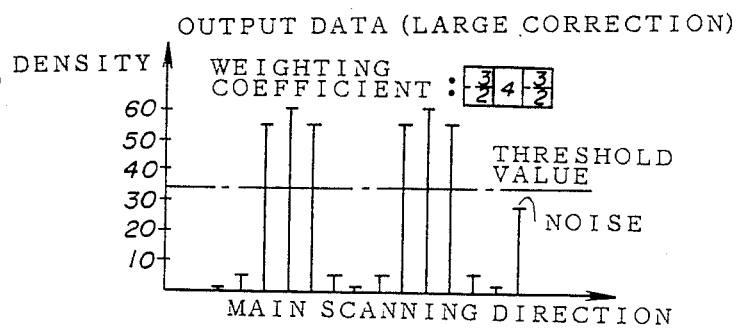

FIG. 14A shows the input image data to the MTF correction circuit 123 when the document image is a clear printed matter having a relatively high contrast, and FIGS. 14B and 14C respectively show corrected image data outputted in response to the input image data shown in FIG. 14A from the MTF correction circuit 123 for different characteristics wherein the weighting coefficients are mutually different. The process of the MTF correction circuit 123 is shown as a one-dimensional process which subjects the data of only three consecutive picture elements in the main scanning direction for the sake of convenience, but similar results are obtained when the process of the MTF correction circuit 123 is a two-dimensional process.

From FIGS. 14A through 14C, it may be seen that the contrast of the output data of the MTF correction circuit 123 increases with an increase in the correction quantity. However, because the gradation data is subjected to the binarization at a specific threshold value, the value of the correction quantity does not greatly affect the required image component. On the other hand, it is seen that the noise component included in the image is also amplified by the increase in the correction quantity. Accordingly, it is possible to obtain a better result when the correction quantity is set to a small value with respect to a document image having a high contrast.

Figure 15A:
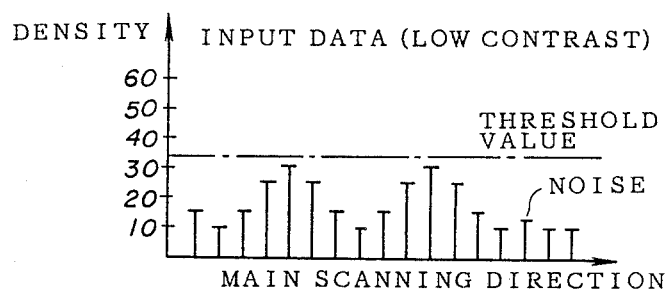
FIG. 15A shows an input image data to the MTF correction circuit when the document image has a relatively low contrast such as characters written by a pencil.
Figure 15B:
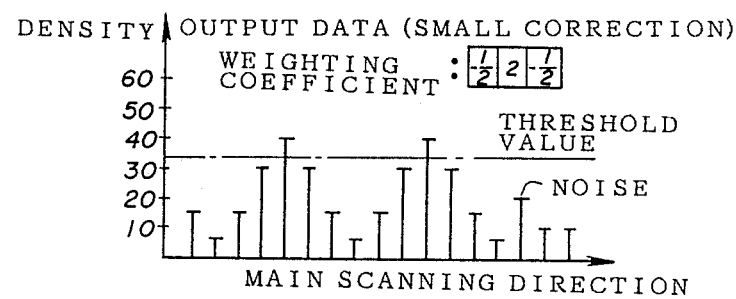
FIGS. 15B and 15C respectively show corrected image data outputted in response to the input image data shown in FIG. 15A from the MTF correction circuit for different characteristics wherein the weighting coefficients are mutually different.
Figure 15C:
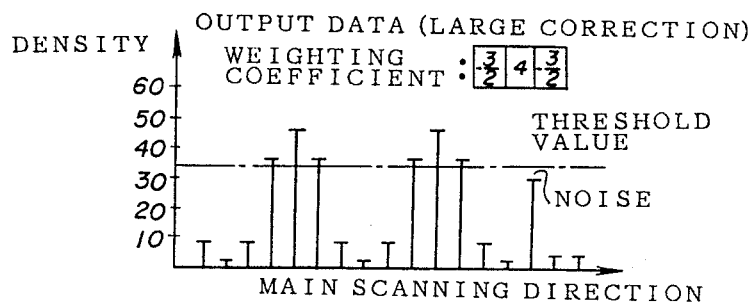
Figure 16A:
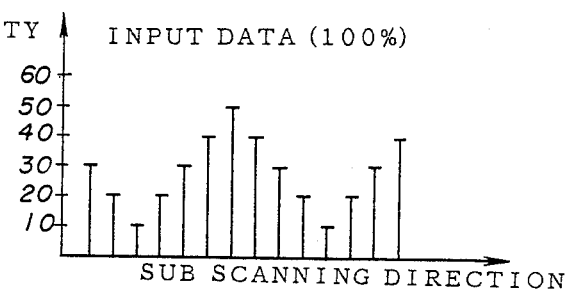
FIGS. 16A and 16B, FIGS. 17A and 17B, and FIGS. 18A and 18B respectively show the input and output data of the MTF correction circuit for the magnifications of 100%, 50% and 200% when making the MTF correction after the adjustment of the magnification.
Figure 16B:
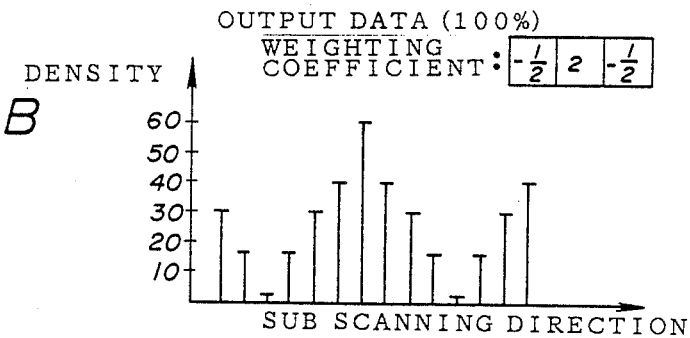
Figure 18A:
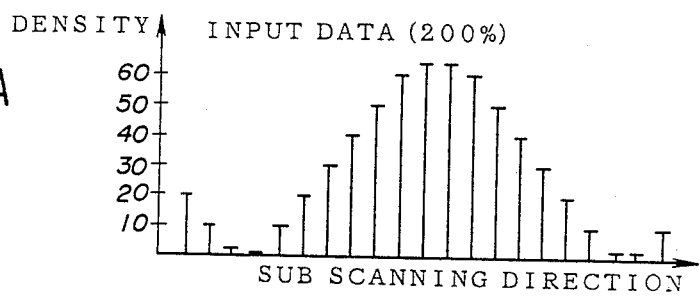
Figure 17A:
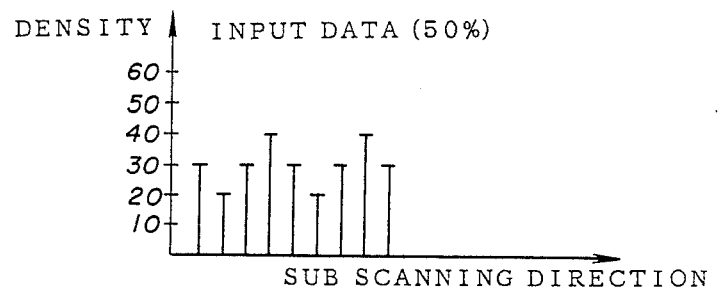
Figure 17B:
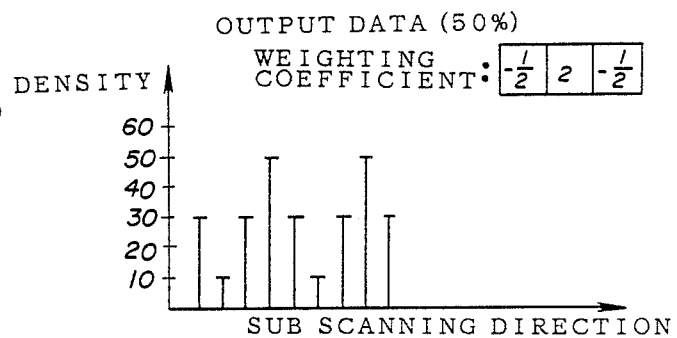
Figure 18B:
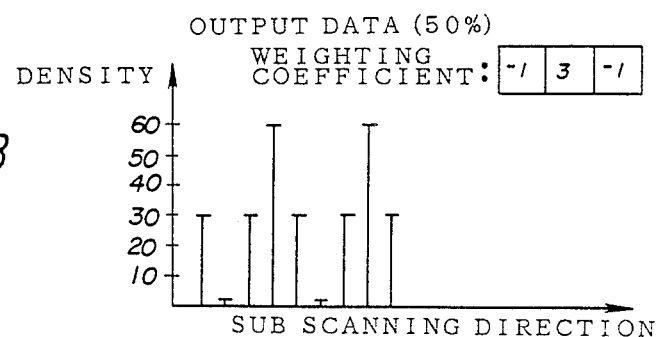

FIG. 15A shows an input image data to the MTF correction circuit 123 when the document image has a relatively low contrast such as characters written by a pencil, and FIGS. 15B and 15C respectively show corrected image data outputted in response to the input image data shown in FIG. 15A from the MTF correction circuit 123 for different characteristics wherein the weighting coefficients are mutually different.

From FIGS. 15A through 15C, it may be seen that a large portion of the image data is less than the threshold level and there is a possibility that a large portion of the image drops out when the correction quantity is small. However, it may also be seen that the density of the image data is amplified and the dropout of the image portion is prevented when the correction quantity is set to a large value. In this case, the noise component is also outputted by the increase in the correction quantity, but the prevention of the dropout of the image portion is more effective in improving the picture quality than reducing the noise component.

FIGS. 16A and 16B, FIGS. 17A and 17B, and FIGS. 18A and 18B respectively show the input and output data of the MTF correction circuit 123 for the magnifications of 100%, 50% and 200% when making the MTF correction after the adjustment of the magnification.

When the magnification is set to 200%, no correction is necessary because the amplitude of the density of the input image data is 100% (that is, MTF=1). In this case, the weighting coefficient of the object picture element is set to "1" and the weighting coefficients of the other picture elements are set to "0" in the MTF correction circuit 123.

When the magnification is set to 100%, the weighting coefficient of the object picture element is set to "2" and the weighting coefficients of the surrounding picture elements are set to "-½" in the case of the one-dimensional processing. In this case, the contrast is improved and it is possible to obtain an MTF value which is similar to that obtained when the magnification is set to 200%.

When the weighting coefficients used for the magnification of 100% are also used for the magnification of 50%, the contrast becomes insufficient. For this reason, when the magnification is set to 50%, it is more desirable that the weighting coefficient of the object picture element is set to "3" and the weighting coefficients of the surrounding picture elements are set to "-1".

FIGS. 19A and 19B, FIGS. 20A through 20C, and FIGS. 21A through 21C respectively show the input and output data of the MTF correction circuit for the magnifications of 100%, 50% and 200% when making the MTF correction after the adjustment of the magnification in the main scanning direction by the thin-out and interpolation of the image data.

Figure 19A:
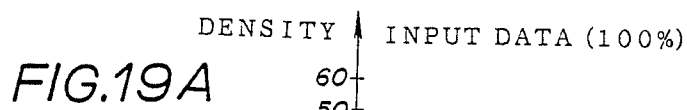
FIGS. 19A and 19B, FIGS. 20A through 20C, and FIGS. 21A through 21C respectively show the input and output data of the MTF correction circuit for the magnifications of 100%, 50% and 200% when making the MTF correction after the adjustment of the magnification in the main scanning direction by the thin-out and interpolation of the image data.
Figure 19B:
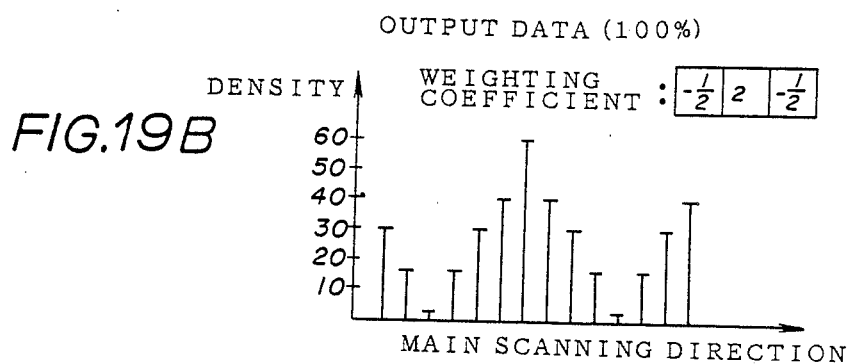

When the weighting coefficient of the object picture element is set to "2" and the weighting coefficients of the surrounding picture elements are set to "-½", satisfactory results are
when the magnification is set to 100% as may be seen from FIGS. 19A and 19B. However, when the magnification is set to 50%, it may be seen from FIGS. 20A and 20B that an overflow (over 64) and an underflow (negative) of the output density occur and that the correction quantity is excessively large. Further, when the magnification is set to 200%, the contrast is insufficient and an inconsistency occurs in the density as may be seen from FIGS. 21A and 21B.

Figure 20A:
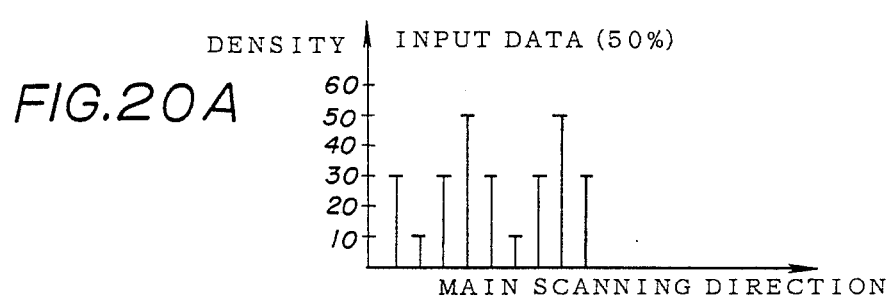
Figure 20B:
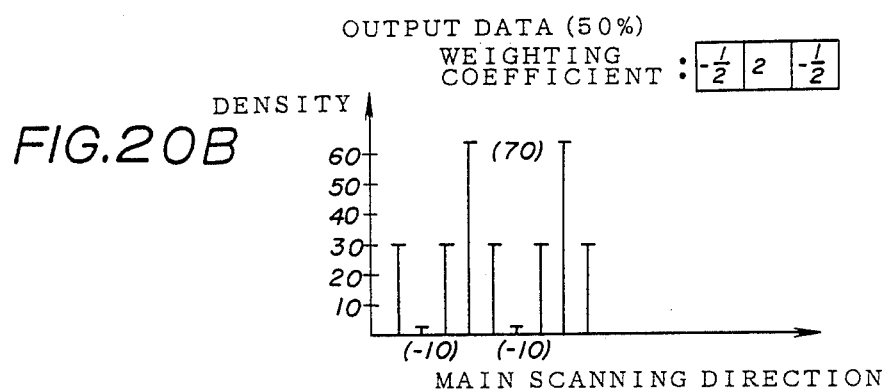
Figure 20C:
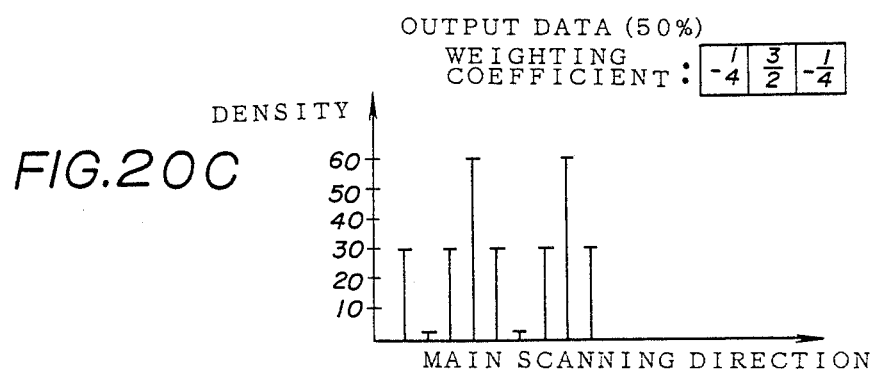
Figure 21A:
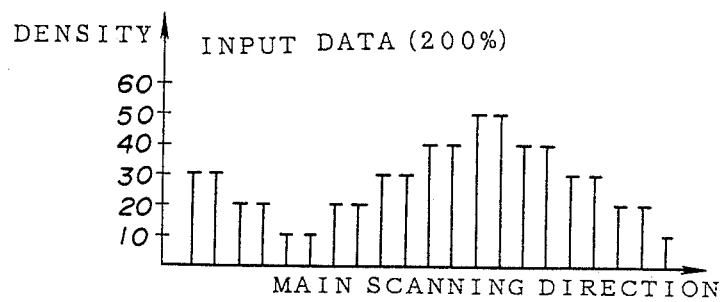
Figure 21B:
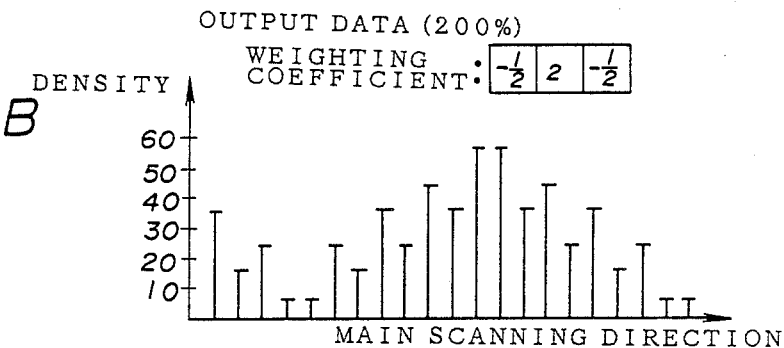
Figure 21C:
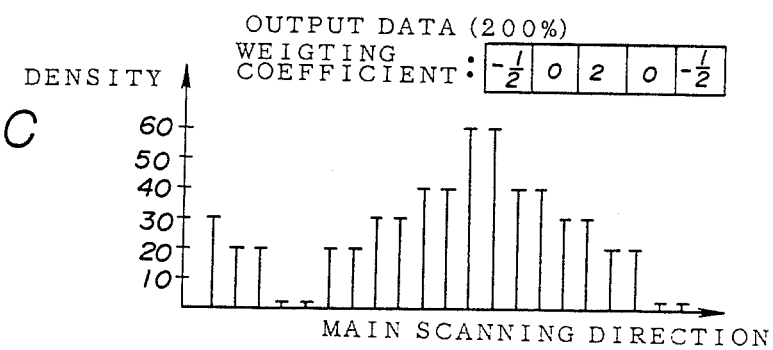

Therefore, when the magnification is set to 50%, it is possible to obtain a more appropriate contrast by setting the weighting coefficient of the object picture element to "3/2" and setting the weighting coefficients of the surrounding picture elements to "-¼", as may be seen from FIG. 20C. In addition, when the magnification is set to 200%, it is possible to improve the contrast and eliminate the inconsistency in the density level by setting a region of five consecutive picture elements in the main scanning direction as the object region and respectively assigning weighting coefficients "½", "0", "2", "0" and "-½" to the five picture elements, as may be seen from FIG. 21C.

In the described embodiment, the weighting coefficients used by the MTF correction circuit 123 include values other than integers, but it is of course possible to use only integral weighting coefficients which are n times those used in the described embodiment by coupling a 1/n dividing circuit (not shown) to the output side of the adder 426 shown in FIG. 8B.

In addition, although the described embodiment uses a filter for emphasizing the high-frequency region as the MTF correction circuit 123, it is of course possible to employ filters having other characteristics or employ a combination of a plurality of kinds of filters.

Further, the present invention is not limited to these embodiments, but various variations and modifications may be made without departing from the scope of the present invention.

What is claimed is:

1. An image processing apparatus comprising:
   image reading means for reading a density of an image of a document in a plurality of minute picture element regions and for outputting an analog image signal indicative of the read density;
   first magnification means for moving one of the document and said image reading means relatively with respect to the other so as to scan the document in a main scanning direction successively along a sub scanning direction with a scanning speed dependent on a designated magnification, thereby changing a magnification of the image in the sub scanning direction;
   converting means for converting the analog image signal output from said image reading means into a digital image signal;
   second magnification means for subjecting the output digital image signal of said converting means to a thin-out and/or an interpolation process, thereby changing the magnification of the image in the main scanning direction; and
   modulation transfer function correction means for correcting image information of a portion of the picture element regions described by the digital image signal whose magnification is adjusted in said first and second magnification means, said modulation transfer function correction means including adjusting means for adjusting correction levels of said modulation transfer function correction means in the main and sub scanning directions depending on a change in the designated magnification, wherein the modulation transfer function correction means comprises a spatial filter which emphasizes high-frequency components so as to emphasize edges of said image.

2. The image processing apparatus as claimed in claim 1 wherein said modulation transfer function correction means includes a spatial filter having the correction levels adjusted by said adjusting means.

3. The image processing apparatus as claimed in claim 1 wherein said converting means includes shading correction means for correcting a gradation level of the digital image signal.

4. The image processing apparatus as claimed in claim 1 wherein said modulation transfer function correction means includes a gamma correction processing means for subjecting the digital image signal to a gamma correction.

5. The image processing apparatus as claimed in claim 1 wherein said modulation transfer function correction means includes a color correction processing means for subjecting the digital image signal to a color correction.

6. The image processing apparatus as claimed in claim 1 wherein said modulation transfer function correction means includes a dither processing means for subjecting the digital image signal to a dither process.

7. An image processing apparatus, comprising:
image reading means for reading a density of an image of a document in a plurality of minute picture element regions and for outputting an analog image signal indicative of the read density;
first magnification means for moving one of the document and said image reading means relatively with respect to the other so as to scan the document in a main scanning direction successively along a sub scanning direction with a scanning speed dependent on a designated magnification, thereby changing a magnification of the image in the sub scanning direction;
converting means for converting the analog image signal output from said image reading means into a digital image signal;
modulation transfer function correction means for correcting image information of a portion of the picture element regions described by the output digital image signal of said converting means, wherein the modulation transfer function correction means comprises a spatial filter which emphasizes high-frequency components so as to emphasize edges of said image; and
second magnification means for subjecting an output digital image signal of said modulation transfer function correction means to a thin-out and/or an interpolation process, thereby changing the magnification of the image in the main scanning direction,
said modulation transfer function correcting means including adjusting means for adjusting correction levels of said modulation transfer function correction means in the main and sub scanning directions depending on a change in the designated magnification.

8. The image processing apparatus as claimed in claim 7 wherein said modulation transfer function correction means includes a spatial filter having the correction levels adjusted by said adjusting means.

9. The image processing apparatus as claimed in claim 7 wherein said converting means includes shading correction means for correcting a gradation level of the digital image signal.

10. The image processing apparatus as claimed in claim 7 wherein said modulation transfer function correction means includes a gamma correction processing means for subjecting the digital image signal to a gamma correction.

11. The image processing apparatus as claimed in claim 7 wherein said modulation transfer function correction means includes a color correction processing means for subjecting the digital image signal to a color correction.

12. The image processing apparatus as claimed in claim 7 wherein said modulation transfer function correction means includes a dither processing means for subjecting the digital image signal to a dither process.

13. An image processing apparatus comprising:
image reading means for reading a density of an image of a document in a plurality of minute picture element regions and for outputting an analog image signal indicative of the read density;
first magnification means including an optical imaging means for imaging the image of the document on a reading surface of said image reading means, said first magnification means adjusting an imaging magnification of said optical imaging means in a main scanning direction depending on a designated magnification;
second magnification means for moving one of the document and said image reading means relatively with respect to the other so as to scan the document in the main scanning direction successively along a sub scanning direction with a scanning speed dependent on designated magnification, thereby changing a magnification of the image in the sub scanning direction;
converting means for converting the analog image signal output from said image reading means into a digital image signal; and
modulation transfer function correction means for correcting image information of a portion of the picture element regions described by the digital image signal which is output from said converting means, said modulation transfer function correction means including adjusting means for adjusting correction levels of said modulation transfer function correction means in the main and sub scanning directions depending on a change in the designated magnification, wherein the modulation transfer function correction means comprises a spatial filter which emphasizes high-frequency components so as to emphasize edges of said image.

14. The image processing apparatus as claimed in claim 13 wherein said modulation transfer function correction means includes a spatial filter having the correction levels adjusted by said adjusting means.

15. The image processing apparatus as claimed in claim 13 wherein said converting means includes shading correction means for correcting a gradation level of the digital image signal.

16. The image processing apparatus as claimed in claim 13 wherein said modulation transfer function correction means includes a gamma correction processing means for subjecting the digital image signal to a gamma correction.

17. The image processing apparatus as claimed in claim 13 wherein said modulation transfer function correction means includes a color correction processing means for subjecting the digital image signal to a color correction.

18. The image processing apparatus as claimed in claim 13 wherein said modulation transfer function correction means includes a dither processing means for subjecting the digital image signal to a dither process.

19. The image processing apparatus as claimed in claim 13 wherein said modulation transfer function correction means includes a spatial filter having the correction levels adjusted by said adjusting means, and said adjusting means includes first adjusting means for adjusting the correction level of said modulation transfer function correction means in the main scanning direction depending on a change in the designated magnification in the main scanning direction and second adjusting means for adjusting the correction level of said modulation transfer function correction means in the sub scanning direction depending on a change in the designated magnification in the sub scanning direction.

20. An image processing apparatus comprising:

image reading means for reading a density of an image of a document in a plurality of minute picture element regions and for outputting an analog signal indicative of the read density;

scanning means for moving one of the document and said image reading means relatively with respect to the other so as to scan the document in a main scanning direction successively along a sub scanning direction;

converting means for converting the analog image signal output from said image reading means into a digital image signal;

magnification means for subjecting the output digital image signal of said converting means to a thin-out and/or interpolation process with respect to the main and sub scanning directions depending on a designated magnification, thereby changing a magnification of the image in the main and sub scanning directions; and modulation transfer function correction means for correcting image information of a portion of the picture element regions described by the digital image signal which is obtained from either of the said converting means and said magnification means, said modulation transfer function correction means including adjusting means for adjusting correction levels of said modulation transfer function correction means in the main and sub scanning directions depending on a change in the designated magnification, wherein the modulation transfer function correction means comprises a spatial filter which emphasizes high-frequency components so as to emphasize edges of said image.

21. The image processing apparatus as claimed in claim 20 wherein said modulation transfer function correction means includes a spatial filter having the correction levels adjusted by said adjusting means.

22. The image processing apparatus as claimed in claim 20 wherein said converting means includes shading correction means for correcting a gradation level of the digital image signal.

23. The image processing apparatus as claimed in claim 20 wherein said modulation transfer function correction means includes a gamma correction processing means for subjecting the digital image signal to a gamma correction.

24. The image processing apparatus as claimed in claim 20 wherein said modulation transfer function correction means includes a color correction processing means for subjecting the digital image signal to a color correction.

25. The image processing apparatus as claimed in claim 20 wherein said modulation transfer function correction means includes a dither processing means for subjecting the digital image signal to a dither process.

26. The image processing apparatus as claimed in claim 20 wherein said adjusting means includes a density discriminating means for discriminating an average density in a specific picture element region of the digital image signal, said adjusting means adjusting the correction levels depending on a change in the average density discriminated by said density discriminating means.

* * * * *